(12) United States Patent
Sideris et al.

(10) Patent No.: US 11,900,522 B2
(45) Date of Patent: Feb. 13, 2024

(54) GRAPHICS PROCESSING

(71) Applicant: Arm Limited, Cambridge (GB)

(72) Inventors: Isidoros Sideris, Cambridge (GB);
Péter Sonkoly, Cambridge (GB);
Adrian Pereiro Castro, Cambridge (GB)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 17/821,666

(22) Filed: Aug. 23, 2022

(65) Prior Publication Data

US 2023/0062386 A1 Mar. 2, 2023

(30) Foreign Application Priority Data

Aug. 27, 2021 (EP) .................................. 21386057.0

(51) Int. Cl.
*G06T 15/00* (2011.01)
*G06F 9/38* (2018.01)

(52) U.S. Cl.
CPC .......... *G06T 15/005* (2013.01); *G06F 9/3887* (2013.01)

(58) Field of Classification Search
CPC .................................................. G06T 15/005
See application file for complete search history.

(56) References Cited

U.S. PATENT DOCUMENTS

| | | |
|---|---|---|
| 10,748,236 B2 | 8/2020 | Forey et al. |
| 10,789,768 B2 | 9/2020 | Forey et al. |
| 2018/0033184 A1* | 2/2018 | Jin ........................ G06T 15/40 |
| 2018/0082399 A1* | 3/2018 | Martin ................... G06T 15/40 |
| 2019/0088009 A1 | 3/2019 | Forey et al. |

FOREIGN PATENT DOCUMENTS

GB 2566487 A 3/2019

OTHER PUBLICATIONS

Combined Search Report and Examination Report under Sections 17 and 18(3) dated Jun. 13, 2022, GB Patent Application No. GB2113733.6.

Sadrosadati, M.,"ITAP", ACM Transactions on Architecture and Code Optimization, Association for Computing Machinery, US, vol. 16, No. 1, Feb. 27, 2019 (Feb. 27, 2019), pp. 1-26, XP058427701, ISSN: 1544-3566, DOI: 10.1145/3291606.

(Continued)

*Primary Examiner* — Shivang I Patel
(74) *Attorney, Agent, or Firm* — Vierra Magen Marcus LLP

(57) ABSTRACT

Disclosed is a method of handling thread termination events within a graphics processor when a group of plural execution lanes are executing in a co-operative state. When a group of lanes is in the co-operative state, in response to the graphics processor encountering an event that means that a subset of one or more execution threads associated with the group of execution lanes in the co-operative state should be terminated: it is determined whether a condition to immediately terminate the subset of one or more execution threads is met. When the condition is not met, the group of execution lanes continue their execution in the co-operative state, but a record is stored to track that the threads in the subset of one or more execution threads should subsequently be terminated.

18 Claims, 8 Drawing Sheets

(56) References Cited

OTHER PUBLICATIONS

Boussinot, F., et al., "Formalisation of Funloft", Oct. 29, 2007 (Oct. 29, 2007), pp. 1-47, XP55919769, Retrieved from the Internet: URL:https://hal.inria.fr/inria-00183242/PDF/fl_formal.pdf.
Nvidia: "Parallel Thread Execution ISA v4.2 Mar. 2015", Mar. 30, 2015 (Mar. 30, 2015), XP055327980, Retrieved from the Internet: URL:https://www.researchgate.net/file.PostFileLoader.html?id=55ad0a16614325ae268b464e&assetKey=ASo/o3A2738153329500170/040 1442294071027.

* cited by examiner

GRAPHICS PROCESSING

CROSS-REFERENCE TO RELATED APPLICATIONS

This application claims priority pursuant to 35 U.S.C. 119(a) to European Patent Application No. 21386057.0, filed Aug. 27, 2021, which application is incorporated herein by reference in its entirety.

BACKGROUND

The technology described herein relates to graphics processing systems, and in particular to graphics processors that include one or more programmable processing stages ("shaders").

Many graphics processing pipelines now include one or more programmable processing stages, commonly referred to as "shaders". For example, a graphics processing pipeline may include one or more of, and typically all of: a geometry shader, a vertex shader, and a fragment (pixel) shader. These shaders are programmable processing stages that execute shader programs on input data values to generate a desired set of output data, for example appropriately shaded and rendered fragment data in the case of a fragment shader, for processing by the rest of the graphics pipeline and/or for output.

The shaders of the graphics processing pipeline may share programmable processing circuit(s), or they may each be executed by distinct programmable processing units.

A graphics processing unit (GPU) shader core is thus a processing unit that performs graphics processing by running small programs for each graphics "work" item in a graphics output, such as a render target, e.g. frame, to be generated (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each work "item" will normally be processed by means of an execution thread which will execute the instructions of the shader program in question for the graphics work "item" in question.

Shader program execution efficiency may be improved by grouping execution threads (where each thread corresponds, e.g., to one vertex in the case of a vertex shader, but could also correspond, e.g., to a ray for use in a ray tracing operation, a fragment or sampling position that is being rendered, etc., depending on the nature of the shader program) into "groups" or "bundles" of threads, where the threads of one group are run in lockstep, e.g. one instruction at a time (single instruction, multiple threads (SIMT) execution). In this way, it is possible to share (e.g.) instruction fetch and scheduling resources between all the threads in the group. Other terms used for such thread groups include "warps" and "wave fronts". For convenience, the term "thread group" will be used herein, but this is intended to encompass all equivalent terms and arrangements, unless otherwise indicated.

In a system where execution threads can be grouped into thread groups, then the functional units for performing the processing operations in response to the instructions in a shader program are normally correspondingly operable so as to facilitate such thread group arrangements. Typically, the functional units are each arranged with plural respective execution lanes, so that a functional unit can execute the same instruction in parallel for plural threads of a thread group.

It is also possible to use multiple processing elements (e.g. a group of plural execution threads executing across plural execution lanes) to perform the same operation on multiple data points simultaneously (single instruction, multiple data (SIMD) execution). In that case an instruction can be defined in terms of its execution as a single thread, such that the group of execution threads executing in SIMD state can be thought of as a single programmable element (rather than a plurality of separate threads executing in lockstep). In the SIMD state, all of the execution lanes may therefore be active, and executing the same instruction.

Again, this can provide various efficiencies, e.g., in terms of sharing the processing load between multiple processing elements, e.g., between plural execution lanes, in particular when the same operation needs to be performed multiple times for different data points.

The Applicants believe that there remains scope for improvements to graphics processors including such programmable execution units.

BRIEF DESCRIPTION OF DRAWINGS

Embodiments of the technology described herein will now be described by way of example only and with reference to the accompanying drawings, in which.

Like reference numerals are used for like elements in the Figures where appropriate.

DETAILED DESCRIPTION

Figure 1:
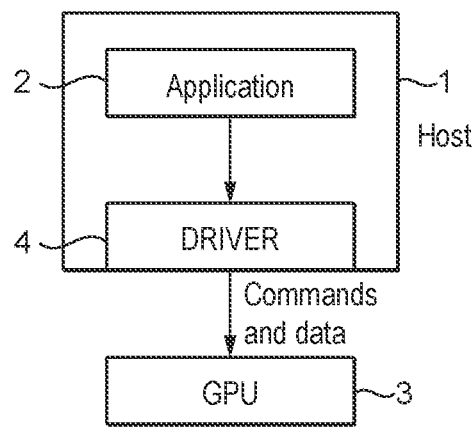
FIG. 1 shows an exemplary graphics processing system.

A first embodiment of the technology described herein comprises a method of operating a graphics processor that comprises a programmable execution unit operable to execute programs to perform graphics processing operations, wherein the execution unit is configured as a plurality of execution lanes, wherein individual execution threads in a group of plural execution threads are executed by respective execution lanes, and wherein a group of plural execution lanes can be caused to execute in a co-operative state in which processing operations are performed using the plural execution lanes together, wherein the graphics processor is arranged such that there are certain events that when encountered mean that individual subsets of one or more threads within a group of plural execution threads being executed by the execution unit should be terminated; the method comprising: the execution unit executing a group of plural execution threads for a graphics processing program, wherein as part of the program execution, in response to an execution thread in the group of plural execution threads encountering within its respective part of the program a set of processing operations that are to be performed by a group of execution lanes in a co-operative state, a group of execution lanes is caused to enter the co-operative state to perform the set of processing operations; and when the group of plural execution lanes are performing the set of processing operations in the co-operative state, in response to the graphics processor encountering an event that means that a subset of one or more execution threads associated with a corresponding one or more of the execution lanes in the group of execution lanes in the co-operative state should be terminated: determining whether a condition to immediately terminate the subset of one or more execution threads is met, and wherein when such condition is not met, the group of execution lanes continue their execution in the co-operative state, and the method comprises storing a record that the threads in the subset of one or more execution threads should subsequently be terminated.

A second embodiment of the technology described herein comprises a graphics processor comprising: a programmable execution unit operable to execute programs to perform graphics processing operations, wherein the execution unit is configured as a plurality of execution lanes, wherein individual execution threads in a group of plural execution threads can be executed by respective execution lanes, and wherein a group of plural execution lanes can be caused to be in a co-operative state in which the group of plural execution lanes perform processing operations together; a thread termination circuit that is operable to cause individual subsets of one or more threads within a group of plural execution threads being executed by the programmable execution unit to be terminated; and a thread termination management circuit that is configured such that when a group of plural execution lanes are performing a set of processing operations in a co-operative state, in response to the thread termination circuit determining that a subset of one or more execution threads associated with a corresponding one or more one of the execution lanes in the group of execution lanes in the co-operative state should be terminated, the thread termination management circuit determines whether a condition to immediately terminate the subset of one or more execution threads is met, and wherein when such condition is not met, the group of execution lanes is allowed to continue their execution in the co-operative state, and the thread termination management circuit stores a record that the threads in the subset of one or more execution threads should subsequently be terminated.

The technology described herein generally relates to graphics processing systems that include a graphics processor comprising a programmable execution unit that is operable to execute execution threads to perform graphics processing operations for graphics processing programs. The execution unit of the graphics processor in the technology described herein is arranged such that a program can be executed by a group of plural execution threads (e.g. a "warp") together. To facilitate this the execution unit is configured as a plurality of execution lanes.

When executing a thread group, the individual execution threads in the thread group can thus be (and are) issued to respective execution lanes of the graphics processor's execution unit for execution. The execution unit can thus execute a group of threads in parallel, with individual threads in the group being executed by respective execution lanes.

In the technology described herein, a group of plural execution lanes may be caused to be in a 'co-operative' execution state, e.g. such that the whole group of plural execution lanes can execute a corresponding group of execution threads (e.g. a whole warp's worth of threads) together, e.g., and in an embodiment, to perform processing operations in a 'co-operative' manner.

When a group of plural execution lanes is in such 'co-operative' state, the group of plural execution lanes can thus be treated, and used, as a whole, e.g. as a single processing element, e.g., and in an embodiment, in a single instruction, multiple data (SIMD) execution state in which all of the execution lanes simultaneously execute execution threads that perform the same set of processing operations, but for different data points, e.g. with individual execution lanes executing execution threads associated with respective data points.

In the 'co-operative' state, the execution lanes in the group of execution lanes will thus in an embodiment all execute threads to perform the same set of processing operations, e.g. in SIMD execution state. However, it will be appreciated that the execution lanes may also operate in other suitable 'co-operative' execution states, as desired.

Thus, according to the technology described herein, when an execution thread (or threads) in a group of execution threads that is being executed by the execution unit requires a set of processing operations for its respective part of the program to be performed by a group of plural execution lanes in a co-operative state, the group of execution lanes is in an embodiment caused to enter the co-operative state to perform the required set of processing operations for the part of the program being executed by the execution thread(s) that triggered the operation (with any other pending execution threads that were being executed in the execution lanes but that had diverged from the part of the program requiring the "co-operative" processing operations in an embodiment being suspended at this point to allow their respective execution lanes to start executing threads for the processing operations to be performed in the co-operative state).

Once the set of processing operations that are required to be performed in the co-operative state has finished, the execution lanes in an embodiment then return to their previous execution state, e.g. to continue executing the respective execution threads that were being executed before the co-operative operations were performed.

The approach described above, in which a group of execution lanes can be (and are) temporarily used to perform a set of processing operations together, in a 'co-operative' (e.g. SIMD) manner, before in an embodiment returning to their previous execution state, can work well in some situations to improve shader program efficiency.

For example, there are certain situations where a set of processing operations can be coded more efficiently when it is known that all of the execution lanes will be active and operable to perform the same set of processing operations (e.g. in SIMD state). Another example of where it may be beneficial to have a group of execution lanes be in a 'co-operative' execution state together is when performing a set of processing operations in which data is to be loaded across multiple execution lanes of a programmable execution unit of a graphics processor, e.g. into a set of shared register files allocated for a group of execution threads executing across the execution lanes. In that case, it may be beneficial to keep all of the execution lanes active for the duration of the set of processing operations in question so that the registers are available as required. Various other examples would be possible.

When a group of execution lanes is in such a co-operative execution state, in which the whole group of execution lanes is active, all of the execution lanes in the group must generally remain active until the set of processing operations to be performed in the co-operative state has finished. Thus, when a group of executions lanes is in a co-operative state, it may not generally be possible to terminate any of individual threads in the execution thread group associated with the execution lanes (e.g. without interfering with the processing operations being performed in the co-operative state, and thereby potentially introducing artefacts to the render output).

However, the Applicants have recognised that there are various situations where it would be desirable to be able to terminate individual threads, or sets of threads. The technology described herein therefore provides an efficient mechanism to do this when the execution unit is operating in such a co-operative state.

For instance, during graphics processor operation, there are various examples of thread termination events that may take place and that mean that an execution thread can (and therefore should) be terminated early.

For example, an execution thread may typically be performing work for a given work item, which may, e.g., in the case of a fragment shader, correspond to a particular graphics fragment to be rendered. However, if it is determined that there is another graphics fragment in the graphics processing pipeline (e.g. a fragment that is further behind in the graphics processing pipeline) that would fully occlude a graphics fragment that is currently being processed by an execution thread, the execution thread for the fully occluded can be safely terminated, since its respective fragment will have no impact on the final render output. There are various examples of such forward 'culling' operations that can be performed within a graphics processor and that resulting in 'culling' events that when encountered by the graphics processor may mean that an execution thread currently executing in the execution unit can and should be terminated early.

These fragment culling events may be performed either for individual execution threads or for subsets of plural execution threads. For example, the latter may be the case when a set of execution threads is performing work for a respective set of fragments (e.g. a respective set of four fragments, which may, e.g., correspond to a 2×2 array of fragments (a 'quad')). Thus, in general, these culling events are performed and tracked for respective subsets of one or more execution threads.

Being able to terminate threads (or subsets of threads) early to cull their respective work items can therefore provide a more efficient use of the execution unit's processing resource, since if it is determined that an execution thread relates to unnecessary work (e.g. since the work item to which the thread relates has no visible effect on the render output) this work can then be avoided. For instance, it will be appreciated that executing (e.g.) a fragment shader can be relatively computationally expensive, and so being able to terminate execution threads within the shader early when it is determined that the fragments they are processing do not produce any visible effects can provide a significant improvement in the overall efficiency of the rendering operation.

However, as mentioned above, the present inventors have recognised that when the execution thread (or threads) that is to be terminated is associated with an execution lane in a group of execution lanes that are executing in a 'co-operative' (e.g. SIMD) state, it may not be possible to immediately terminate the thread(s), e.g. as all of the lanes in the group of execution lanes are currently active in the co-operative state, and should remain active until the operations in the co-operative state have finished. That is, the execution lane associated with the execution thread(s) is at that point busy doing the co-operative processing work, either for the thread(s) in question (the thread(s) that is to be terminated), or for another thread in the group (in which case the thread(s) that is to be terminated may currently be 'suspended' pending the co-operative processing work, but is still associated with its respective execution lane). This means that the execution unit cannot immediately terminate the thread(s) without interfering with the processing operations being performed in the 'co-operative' (e.g. SIMD) state.

In the technology described herein any such events that mean a subset of one or more execution threads can be terminated that take place when the execution unit is in a 'co-operative' (e.g. SIMD) state are therefore tracked in order to allow such thread termination operations to be performed as and when it is possible to do so, e.g., and in particular, when it is possible to terminate the thread or threads without interfering with the co-operative (e.g. SIMD) operations.

This approach therefore allows a group of execution lanes to be temporarily used to perform an arbitrary set of processing operations in a co-operative manner, as described above, and as desired, whilst still retaining the possibility and benefit of being able to terminate execution threads when it is possible to do so in response to various thread termination events (e.g. rather than simply ignoring any thread termination events that occur during the co-operative processing operations, as there would otherwise be no mechanism to handle this situation).

For instance, in some examples, a thread termination event may correspond to a 'global' kill event that can be implemented immediately during the "co-operative" (e.g. SIMD) processing operations without causing any issues, e.g. since all of the threads associated with the group of execution lanes are to be terminated. An example of this might be when the graphics processor is switched to a new graphics processing task, in which case all of its current processing work (including the work being performed in the co-operative state) can be terminated. More generally, a thread may be (and in an embodiment is) immediately terminated when it is determined that all of the execution threads in the execution thread group should be terminated.

Another example would be when it is determined that (all of) the execution thread(s) that triggered the co-operative state operations should be terminated (even if that is less than all of the threads in the thread group).

Various other examples would be possible.

(An execution thread may also be terminated immediately when the execution thread that should be terminated is not associated with the group of execution lanes in the co-operative state. For example, this may be the case if the execution unit has more lanes than would be required to process a single execution thread group, e.g. such that multiple thread groups can execute in parallel, and such that the group of lanes that is used in the co-operative manner may correspond to a subset of less than all of the lanes of the execution unit, and the thread to be terminated corresponds to one of the other lanes that is not in the co-operative state.)

Thus, in some situations, it is possible to immediately terminate an execution thread (even when its respective lane is in a 'co-operative' processing state), and in that case, this is in an embodiment done.

According to the technology described herein, in response to the graphics processor encountering an event that means that a subset of one or more execution threads should be terminated, the graphics processor therefore first determines whether a condition is met such that the subset of one or more execution threads can be terminated immediately (e.g. a 'global' kill event). If the condition is met, the subset of one or more execution threads is then terminated appropriately.

Typically, and in embodiments, this is because the whole execution thread group can be terminated, in which case this is in an embodiment done, with the program execution terminating for the current thread group, and a new thread group being generated accordingly in its place. Thus, in that case, the execution of the set of processing operations being performed in the 'co-operative' state is terminated. However, other arrangements would be possible.

On the other hand, if the condition to immediately terminate the subset of one or more execution threads is not met (e.g. because the respective execution lane or lanes are currently active in the co-operative state, and need to remain active in the co-operative state because there are other threads in the execution thread group that still require the co-operative state processing operations), the technology described herein tracks that this event has occurred by storing a record indicating that the (subset of) execution thread(s) should subsequently be terminated such that the thread(s) can then be (and is) subsequently terminated when it is possible to do so.

For instance, once the processing operations to be performed in the co-operative state operations have finished, at that point there is no longer a need to keep all of the execution lanes active, and the lanes can be (and are) returned to their previous execution state. Thus, any execution threads that should be terminated but were not yet terminated because the execution lanes were in the co-operative state, and for which threads an appropriate record entry is stored to indicate that the thread should be terminated, can be (and in an embodiment are) terminated at that point.

Thus, in embodiments, for any (subsets of) execution threads for which a record was stored to indicate that the execution thread should subsequently be terminated, the execution threads are subsequently terminated once the processing operations being performed in the co-operative state have finished. Accordingly, in embodiments, when it is not possible to terminate a subset of one or more execution threads that should be terminated when the group of execution lanes are in the co-operative state, such that a record of that subset of one or more execution threads is stored, the method further comprises: terminating the subset of one or more execution threads once the set of processing operations being performed by the group of execution lanes in the co-operative state has finished and the group of execution lanes has exited the co-operative state.

Likewise, in some cases, whilst it may not (yet) be possible to terminate a subset of one or more execution threads in response to a first thread termination event, there may be second or further thread termination events that occur during the co-operative state operation that mean that the subset of one or more execution threads can be terminated. For instance, a first thread termination event may mean that (only) a first subset of one or more execution threads in the group of execution threads should be terminated, in which case it may not be possible to immediately terminate the first subset of one or more execution threads as the execution lane(s) may still need to remain active. However, if subsequent thread termination events mean that other (e.g. all the other) execution threads in the group of execution threads should also be terminated, the first subset of one or more execution thread(s) may be terminated at that point, even if the co-operative processing operations have not yet finished.

Thus, in embodiments, the method comprises: when the group of plural execution lanes are performing the set of processing operations in the co-operative state: the graphics processor encountering a first event that means that a first subset of one or more execution threads associated with a corresponding one or more of the execution lanes in the group of execution lanes in the co-operative state should be terminated, but wherein the condition to immediately terminate the first subset of one or more execution threads is not met, such that the group of execution lanes continue their execution in the co-operative state, and a record is stored that the first subset of one or more execution threads should subsequently be terminated; and whilst the group of plural execution lanes are continuing to perform the set of processing operations in the co-operative state: in response to the graphics processor encountering a second event that means that a second subset of one or more execution threads associated with a corresponding one or more other of the execution lanes in the group of execution lanes in the co-operative state should be terminated: determining whether a condition to immediately terminate the first and second subsets of execution threads is met, and when the condition to immediately terminate the first and second subsets of execution threads is met, the group of execution lanes exiting the co-operative state and the execution unit terminating the first and second subsets of execution threads.

Various other arrangements would be possible in this regard.

The technology described herein thus provides an efficient mechanism for handling such thread termination events that may occur when a group of execution lanes are executing in a co-operative state. This may therefore provide various benefits compared to other possible approaches.

The graphics processor can be any suitable and desired graphics processor that includes a programmable execution unit that can execute program instructions.

In the technology described herein, the graphics processor and the programmable execution unit is operable to execute shader programs for groups ("warps") of plural execution threads together.

In the case where execution threads are grouped into thread groups (warps) in the manner discussed above, the functional units, etc., of the programmable execution unit are in the technology described herein configured and operable so as to facilitate such thread group arrangements. Thus, for example, the functional units are arranged as respective execution lanes, e.g. one for each thread that a thread group (warp) may contain (such that, for example, for a system in which execution threads are grouped into groups (warps) of eight threads, the functional units may be operable as eight respective (and identical) execution lanes), so that the programmable execution unit can execute the same instruction in parallel for each thread of a thread group (warp).

The technology described herein in particular relates to situations where a group of execution lanes are caused to be in a co-operative execution state in which all of the execution lanes in the group of execution lanes are active to perform a set of processing operations together. For example, and in an embodiment, the group of execution lanes are caused to operate in a single instruction, multiple data (SIMD) execution manner, and the group of one or more execution threads that are together brought into the active state comprises such a thread group (warp). However, other co-operative processing arrangements are also contemplated. For instance, the plural execution lanes could execute threads in, e.g., a single instruction, multiple thread (SIMT) state, where execution threads execute program in lockstep, e.g. one instruction at a time, but execution threads can still perform different processing operations, but in a co-operative fashion (e.g. utilising shared resources).

The group of plural execution lanes that are caused to be in the co-operative state according to the technology described herein can be any suitable and desired group of plural execution lanes. For instance, the group of execution lanes may comprise two or more execution lanes, such as four, eight or sixteen (or more, such as 32, 64 or 128) execution lanes. In an embodiment the group of plural execution lanes that are caused to be in the co-operative state corresponds to the group of all of the execution lanes in the execution unit.

For instance, where the execution unit is configured such that there is a respective execution lane for each thread in a thread group (warp) of a desired size, in an embodiment all of the execution lanes are caused to be in a co-operative state together, such that the set of processing operations are then performed using a whole thread group that performs a set of processing operations together, e.g., and in an embodiment in SIMD execution state.

However, in principle, any suitable group of plural execution lanes may be caused to be in the co-operative state and used accordingly in the manner described herein. For example, it may be the case that the processing unit is configured to have more execution lanes than the number of threads in a given execution thread group (warp) size. In that case, it may be desirable to only use a subset, e.g. half, of the available execution lanes in the co-operative state. Various other arrangements would be possible.

Any references to a group of execution lanes being in an co-operative state should therefore be understood accordingly to mean either that all of the execution lanes, or a suitable subset of (plural of) the execution lanes, are in the co-operative state.

The group of execution lanes may be caused to be in the co-operative state in any suitable and desired way. In an embodiment this is done by including in a program to be executed by a group of plural execution threads, an 'activation' instruction that when executed by an execution thread in the group of execution threads will cause a group of plural execution lanes to be in a co-operative state in which processing operations can be performed using the plural execution lanes together.

In that case, the program in an embodiment further comprises, subsequent in the program execution order to the activation instruction that will cause the group of plural execution lanes to be in the co-operative state, a set of one or more instructions to cause one or more processing operations to be performed using the group of plural execution lanes together.

Thus, in embodiments, the method comprises: when the program is being executed by an execution thread, in response to an execution thread executing the activation instruction: causing a group of plural execution lanes to be in a co-operative state in which processing operations can be performed using the group of plural execution lanes together; and then performing one or more processing operations using the group of plural execution lanes together.

The activation instruction can thus be included in a shader program to be executed at a suitable position ahead of a set of processing operations that is to be performed using a group of execution lanes in a 'co-operative' manner (e.g., and in an embodiment, in SIMD execution state). In this way, once an execution thread (or threads) in a thread group that is executing the program executes the activation (e.g. an 'enter SIMD state') instruction, such that a group of plural (e.g. all of the) execution lanes of the execution unit are caused to be active in the co-operative state, a subsequent set of one or more processing operations can then be performed in the co-operative state using the group of plural execution lanes together.

The use of an activation ('enter SIMD state') instruction in this way thus provides a particularly efficient way to ensure that a group of execution lanes are all active in the same co-operative state together, such that a subsequent set of processing operations can then be performed using the whole group of execution lanes together (e.g. in SIMD execution state).

In this respect, the present inventors recognise that there may be various situations where it may be desired (or required) for a whole group of plural execution lanes to be in a co-operative state together, such that the same, single set of processing operations can be executed across the whole group of execution lanes (e.g. in SIMD execution state), but wherein less than all of the execution lanes may be active at the point at which the set of processing operations are required to be executed.

The use of such an activation instruction means that different actions can be (and in an embodiment are) taken depending on the state of an execution lane at the point at which this operation occurs. For instance, there are various reasons why an execution lane may not be active at a particular processing instance. This may be because the thread that was associated with that lane has already been terminated, in which case a new thread needs to be generated to perform the processing operations in the co-operative state (but which newly generated thread can then be, and in an embodiment is, discarded once the "co-operative" processing operations have finished). Or, this may be because there has been a divergence, in which case the execution thread may be in a pending state, waiting for the program to reach its part of the program, and in which case the thread is in an embodiment 'suspended' to allow a new thread to be generated in that lane to perform the co-operative operations (and in an embodiment suspended in such a manner that the execution lane can return to executing the pending thread once the co-operative operations have finished).

The use of such activation instruction thus provides a mechanism to allow any execution lanes that are not currently active to be brought into a desired co-operative execution state for performing a set of processing operations, regardless of the previous execution state of the execution lanes.

The co-operative operation of the technology described herein is thus in an embodiment triggered by including appropriate instructions into a shader program, as described above. Such instructions can be included in a shader program to be executed by the programmable execution unit in any suitable and desired manner and by any suitable and desired element of the overall data (graphics) processing system, e.g. depending on how the shader programs are generated. In an embodiment, it or they is generated by a compiler (the shader compiler) for the graphics processor of the graphics processing system in question (and thus the processing circuit that generates the shading program in an embodiment comprises an appropriate compiler (compiler processing circuit)).

The compiler is in an embodiment executed on an appropriate programmable processing circuit of the graphics processing system. For example, the compiler (the compiler processing circuit) is in an embodiment part of, and in an embodiment executes on, a central processing unit (CPU), such as a host processor, of the graphics processing system, and is in an embodiment part of a driver for the graphics processor that is executing on the CPU (e.g. host processor).

The compilation process (the compiler) can generate the shader program in any suitable and desired manner, e.g., and in an embodiment, using any suitable and desired compiler techniques for that purpose.

After the activation (enter SIMD state') instruction has been executed, an execution thread group being executed by the group of plural execution lanes in the co-operative state can thus start executing an arbitrary set of one or more processing operations that are to be executed using the plural execution threads together, as desired, as it can be (and is) ensured at this point that all of the execution lanes in the group of plural execution lanes will be in the active state.

Once the set of processing operations that are to be performed using the group of plural execution lanes together (e.g. in SIMD execution state) have finished, the execution threads being executed by the execution lanes are in an embodiment then allowed (or caused) to return to their previous execution state, as desired.

Thus, in embodiments, the method further comprises allowing (or causing) the execution lanes to return to their prior execution state, i.e. the state they were in prior the activation ('enter SIMD state') instruction being executed.

The execution threads may be returned to their previous state in any suitable and desired fashion, e.g. depending on the program that is being executed.

In embodiments, a further 'deactivation' (e.g. 'exit SIMD state') instruction is provided that causes all of the execution threads in the group of execution threads to return to their previous state at the same time. In that case the execution thread group exits the 'co-operative' state as a whole. This means that if the execution threads had diverged when performing the co-operative processing operations, they should in an embodiment have re-converged by the point at which the further deactivation (exit SIMD state) instruction is executed.

In an embodiment, the set of instructions to perform the one or more processing operations are included in a sub-routine, such that causing the execution thread to start performing the one or more "co-operative" processing operations comprises causing the execution thread to jump to the start of the sub-routine. Thus, when the activation instruction is executed, after the execution threads have been made active (with any data written in/out for the threads, as required) the threads are in an embodiment then all caused to jump to a new program location for the set of processing operations and start executing the set of processing operations.

Thus, in embodiments, in response to executing the activation instruction: the method comprises: causing all of the execution lanes in the group of execution lanes that are caused to be in the active state to jump to a sub-routine including the set of one or more instructions to perform the one or more processing operations that are to be performed using the group of plural execution lanes together.

Once the group of execution lanes is active in the co-operative state, the set of processing operations can then be executed using the respective group of execution threads executing in the execution lanes accordingly.

The set of processing operations that is performed using the execution thread group in a co-operative manner can include any suitable processing operations as desired.

For instance, whilst it may be beneficial for all of the execution threads to be active at the start of the set of processing operations (and the technology described herein achieves this) it may not be necessary for all the execution threads in the group to remain active whilst the set of processing operations is being performed.

Thus, the set of "co-operative" processing operations that are performed by the execution thread group as a whole may include, e.g., one or more conditional operations, such that threads may diverge/branch, and then re-converge, e.g., as required.

The technology described herein in particular relates to situations where, when a group of execution lanes are in a co-operative state, as described above, the graphics processor encounters an event that means that an individual execution thread (or generally a subset of one or more execution threads) in a group of execution threads being executed by the execution unit can (and should) be terminated.

For instance, there are various examples of events that may occur that may mean that a subset of one or more execution threads should be terminated.

An example of this would be where it is determined that the work item (e.g. a graphics fragment in the case of a fragment shader) to which the thread relates will have no visible effect on the graphics processing output. For instance, in the case of a fragment shader, it may be determined by early depth testing, or other such fragment culling operations, that a fragment or set of fragments (e.g. a quad) may be fully occluded by another fragment (or quad) that is being processed elsewhere in the overall graphics processing pipeline. In that case, the execution threads for the occluded fragments can (and should) be terminated early ('in-flight').

Thus, in embodiments, the event that means that the subset of one or more execution threads should be terminated is triggered by another processing operation within the graphics processor, and in particular the event relates to the processing of a work item (e.g. fragment or set of fragments) earlier in the overall graphics processing pipeline that the execution unit is part of.

The graphics processor is thus in an embodiment arranged such that there are certain events that are external to the execution unit that when encountered mean that individual subsets of one or more threads within a group of plural execution threads being executed by the execution unit should be terminated. That is, in embodiments, the event that means that a subset of one or more execution threads associated with a corresponding one or more of the execution lanes in the group of execution lanes in the co-operative state should be terminated is an event that takes place externally to the execution unit.

As mentioned above, in some embodiments, these are events that take place within the graphics processor, e.g. but in a different (e.g. earlier) stage of the graphics processing pipeline.

For example, these events may correspond to various fragment culling operations (stages) within the graphics processing pipeline such as but not limited to (early) depth or depth/stencil testing, so-called 'forward pixel kill' operations, e.g. as described in U.S. Pat. No. 10,789,768 (Arm Limited) which is entirely incorporated herein by reference, and any other suitable fragment culling and/or hidden surface removal operations that may be performed within the graphics processor.

Further examples of operations that may trigger such events are those described in U.S. Pat. No. 10,748,236 (Arm Limited), also entirely incorporated herein by reference.

Thus, in an embodiment, the execution unit is part of a fragment shader and the fragment shader is part of an overall graphics processing pipeline that includes one or more forward fragment culling stages that are capable of killing fragments that are further ahead in the graphics processing pipeline. That is, in embodiments, the graphics processing program that is performed by the execution unit corresponds to a fragment shader program that is being executed as part of a graphics processing pipeline, wherein individual execution threads process respective fragments, and wherein the event that means that a subset of one or more execution threads should be terminated corresponds to a fragment culling operation from another stage in the graphics processing pipeline, the fragment culling operation indicating that a respective one or more fragment(s) can be culled, and thereby indicating that the corresponding execution threads for the one or more fragment(s) to be culled should be terminated.

However, there may be various other types of events that mean that an execution thread should be terminated, e.g. depending also on the type of shader.

For instance, in some cases, a thread termination event may be triggered by an event that takes place completely externally to the graphics processor, e.g. by an event that is triggered by an application executing on a host processor that is using the graphics processor as an accelerator. An example of this might be when the application requiring the graphics processor switches render output in which case all of the processing work for the current render output can be discarded (such that all of the currently executing threads should be terminated).

Correspondingly, in some cases, it would also be possible that an event that takes place within the execution unit itself but that is nevertheless independent of a particular execution thread means that the execution thread should be terminated. For example, this could be the case where the execution unit is executing plural thread groups ("warps"), e.g. one after another, and it is determined that a later thread group means that an execution thread in another thread group (the currently executing thread group) should be terminated.

Thus, more generally, and in embodiments, the event that means that a subset of one or more execution threads associated with a corresponding one of the execution lanes in the group of execution lanes in the co-operative state should be terminated may be any suitable event that takes place independently of the execution of the execution thread itself.

Various arrangements would be possible in this regard.

When such thread termination events are encountered (in whatever form they take) when the execution unit is in a co-operative state, it may not be possible to terminate the execution thread(s) immediately. Thus, as mentioned above, the graphics processor is operable to first check a condition to determine whether or not a subset of one or more execution threads that is to be terminated can be immediately terminated.

For example, and in an embodiment, the condition may be whether or not all of the threads in the thread group associated with the group of execution lanes that are operating in the co-operative state are able to be terminated. That is, in embodiments, a thread is only terminated during the co-operative state execution when it is determined that all of the threads associated with the group of execution lanes in the co-operative state can be terminated. This condition would be trivially met when the thread termination is a 'global' kill event but could also be cumulatively met in response to a series of events that mean that all of the threads in the thread group can be terminated.

However, there are other examples of suitable conditions that could be checked to determine whether or not a subset of one or more threads can be immediately terminated during the co-operative state execution. For instance, another example, would be when it is determined that the thread (or threads) to be terminated is the thread(s) that triggered the co-operative state execution.

If the condition is met, such that the thread(s) can be terminated immediately, the thread(s) can then be terminated appropriately, using any suitable and desired thread termination protocol, e.g. in the normal way for terminating threads.

On the other hand, in cases where the condition is not met, such that the thread(s) cannot be terminated immediately, the technology described herein stores a record that the subset of one or more execution threads should subsequently be terminated.

The record generally maintains a list of any threads that should be terminated when it is possible to do so.

This record may take any suitable and desired form. For example, and in an embodiment, this record could be implemented using a suitable thread termination bit mask that applies to the execution thread group, with a respective bit entry in the mask provided for each execution thread in the execution thread group. Thus, the thread termination bit mask may be initially all zeros. Whenever an event takes place that makes that a thread should be terminated, its respective bit entry in the thread termination bit mask can then be set accordingly (to '1'). In that case, when all of the threads in the group can be terminated, the respective bit entries in the thread termination bit mask will be set for all of the threads, and so determining whether the condition for immediate thread termination is met may comprise checking that this is the case.

The thread termination bit mask thus in an embodiment represents and tracks the actual discard state of the threads. For instance, during the co-operative processing operations the lane masks are re-purposed to keep all of the lanes active, and so are not available for tracking the actual discard state. This is therefore in embodiments done using a suitable mask that is maintained as a separate record. Once the co-operative processing operations have finished, the lane mask (which was keeping all of the lanes active for the co-operative processing operations) can then be replaced appropriately by the record indicating the actual discard state of the execution threads in the thread group to allow any threads that should be terminated to be terminated appropriately. The record is in that case then used as the lane mask for the continued program execution.

Thus, in embodiments, the record comprises a bit mask that tracks and stores the actual discard state for each of the execution threads in the execution thread group.

In embodiments, the record is stored for a whole subset of execution threads. Thus, where the subset of execution threads includes plural execution threads (e.g. four execution threads for processing a 'quad' of fragments), a record is in an embodiment stored for the whole group of plural execution threads. In that case, there may be only a single bit value stored per subset of execution threads (rather than storing a bit value for each thread in the subset of threads).

However, various other arrangements would also be possible and the record may generally take various other forms, so long as it is able to suitably track which threads should subsequently be terminated so that this information is carried through the co-operative processing operations to allow the threads to be terminated when it is possible to do so.

In this way, by storing such a record of any such external events that mean an execution thread should be terminated, the graphics processor is able to track such external events and terminate execution threads appropriately when it is possible to do so. For instance, this may be when the execution unit has finished its operations in the co-operative state, such that threads can be terminated individually, as required. Or, as mentioned above, it may be when the record indicates that all of the threads in the current thread group can be terminated, in which case the operations in the co-operative state can also be terminated early, and the thread group terminated as a whole. Various other arrangements would be possible in this regard.

The technology described herein thus provides a thread termination management circuit that is operable to manage such thread termination events as and when they occur. For instance, when a thread termination event takes place (e.g. a forward pixel kill operation, etc.), this may be indicated to the thread termination management circuit, to cause the thread termination management circuit to determine whether or not the thread can be immediately terminated.

For instance, such thread termination events may typically be signalled to a thread group ("warp") controller for the execution unit. For example, the execution unit will typically be associated with one or more thread group controller that is operable to control the allocation of work items (e.g. fragments) to respective thread groups for the fragment shading operations to be performed by the execution unit, and the issuing of thread groups to the execution unit for the execution of the fragment shading programs by respective thread groups.

Thus, whenever a thread termination event occurs, this is in an embodiment signalled to the thread group controller appropriately. For example, in the case of a fragment shader that is part of a graphics processing pipeline including a forward pixel kill stage, the forward pixel kill stage may be operable to signal forward pixel kill operations to the thread group controller.

The thread group controller can then signal the thread termination operation appropriately to a respective thread group controller that can then terminate the threads as required. However, in the technology described herein, before terminating a thread, it is checked whether the execution unit is operating in a 'co-operative' state, and if so, it is then checked whether or not the thread can be immediately terminated or whether it should be tracked to allow the processing operations in the 'co-operative' state to finish (or at least tracked until it is possible to safely terminate the thread).

In an embodiment this is done whenever a thread termination event takes place. That is, in embodiments, whenever a thread termination event takes place, it is always checked whether or not the thread should be immediately terminated.

For instance, this is in an embodiment checked when fetching the next instruction in the program. So, whenever a new instruction is fetched, it may be checked at that point whether there have been any thread termination events, and if so, it is then checked whether or not the condition to immediately terminate the thread is met. To facilitate this operation the thread termination management circuit is thus in an embodiment logically positioned within or alongside a thread group controller for the execution unit, with any thread termination event signals being routed through the thread group controller, e.g. as might normally be the case. However, other arrangements would be possible.

The effect of all this is therefore to provide an efficient mechanism for allowing threads to be terminated when the execution unit is operating in a co-operative execution state.

Subject to the particular requirements of the technology described herein, the graphics processor can be any suitable and desired graphics processor that includes a programmable execution unit that can execute program instructions.

The programmable execution unit of the graphics processor can be any suitable and desired programmable execution unit that is operable to execute shader programs.

The graphics processor may comprise a single programmable execution unit, or may have plural execution units. Where there are a plural execution units, each execution unit can, and in an embodiment does, operate in the manner of the technology described herein.

Where there are plural execution units, each execution unit may be provided as a separate circuit to other execution units of the data processor, or the execution units may share some or all of their circuits (circuit elements).

The (and each) execution unit should, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store type units (such as blend or store units), etc.

The graphics processor in an embodiment also comprises any other appropriate and desired units and circuits required for the operation of the programmable execution unit(s), such as appropriate control circuits (control logic) for controlling the execution unit(s) to cause and to perform the desired and appropriate processing operations.

Thus the graphics processor in an embodiment also comprises an appropriate thread group execution controller (scheduler) circuit, which is operable to issue thread groups to the programmable execution unit for execution and to control the scheduling of thread groups on/to the programmable execution unit for execution. In embodiments, it is this thread group execution controller (scheduler) circuit that manages the thread termination operations according to the technology described herein. The thread termination management circuit may thus comprise a part of the thread group execution controller (scheduler) circuit, or it may be separate from but in appropriate communication with the thread group execution controller (scheduler) circuit.

In an embodiment, the graphics processor comprises one or more of, and in an embodiment all of: an instruction decode circuit or circuits operable to decode instructions to be executed; an instruction issue circuit or circuits operable to issue instructions to be executed to the programmable execution unit so as to cause the execution unit to execute the required instructions for a thread group; an instruction fetch circuit or circuits operable to fetch instructions to be executed (prior to the decode circuit(s)); an instruction cache for storing instructions locally to the programmable execution unit for execution by execution threads being executed by the programmable execution unit; an execution thread generator (spawner) circuit that generates (spawns) (groups of) threads for execution; and an execution thread scheduler circuit that schedules (groups of) threads for execution (this may be part of the thread generator).

As well as the programmable execution unit, the graphics processor includes a group of plural registers (a register file) operable to and to be used to store data for execution threads that are executing. Each thread of a group of one or more execution threads that are executing a shader program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

Where there are plural execution units, each execution unit may have its own distinct group of registers (register file), or there may be a single group of registers (register file) shared between plural (e.g. some or all) of the separate execution units.

The group(s) of registers (register file(s)) can take any suitable and desired form and be arranged in any suitable and desired manner, e.g., as comprising single or plural banks, etc.

The graphics processor will correspondingly comprise appropriate load/store units and communication paths for transferring data between the registers/register file and a memory system of or accessible to the graphics processor (e.g., and in an embodiment, via an appropriate cache hierarchy).

Thus the graphics processor in an embodiment has an appropriate interface to, and communication with memory (a memory system) of or accessible to the graphics processor.

The memory and memory system is in an embodiment a main memory of or available to the graphics processor, such as a memory that is dedicated to the graphics processor, or a main memory of a data processing system that the graphics processor is part of. In an embodiment, the memory system includes an appropriate cache hierarchy intermediate the main memory of the memory system and the programmable execution unit(s) of the graphics processor.

The technology described herein has been described above with reference to the operation of the graphics processor in general. In the case where the graphics processor includes multiple processing cores, then each processing core can, and in an embodiment does, operate in the manner of the technology described herein (i.e. such that each processing core has its own respective execution processing circuit, thread issuing circuit, etc., all of which are operable in the manner of the technology described herein).

In some embodiments, the graphics processor comprises, and/or is in communication with, one or more memories and/or memory devices that store the data described herein, and/or store software for performing the processes described herein. The graphics processor may also be in communication with a host microprocessor, and/or with a display for displaying images based on the data generated by the graphics processor.

In an embodiment, the graphics processor is part of an overall data processing system that comprises one or more memories and/or memory devices and a host processor (and, optionally, a display). In an embodiment, the host microprocessor is operable to execute applications that require data processing by the graphics processor, with the graphics processor operating in the manner of the technology described herein when required to process data by applications executing on the host processor.

Other arrangements would, of course, be possible.

The graphics processor of the technology described herein can be used for all forms of output that a graphics processor (and processing pipeline) may be used to generate. For example, in the case of graphics processing operations, the graphics processor may generate frames for display, render-to-texture outputs, etc. The output data values from the processing are in an embodiment exported to external, e.g. main, memory, for storage and use, such as to a frame buffer for a display. In an embodiment, the graphics processor is used for performing ray tracing operations. However, the graphics processor may be used for any suitable rendering scheme. Moreover, the graphics processor need not perform graphics processing operations but may also be configured to perform general purpose graphics processing operations.

The technology described herein is thus applicable to any suitable form or configuration of graphics processor and data processing system.

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, and stages of the technology described herein may comprise a suitable processor or processors, controller or controllers, functional units, circuitry/circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display by a graphics processor. However, it will be appreciated that the techniques for handling groups of execution threads described herein can be used in other non-graphics contexts in which groups of threads are used, e.g. for general purpose graphics processing.

FIG. 1 shows a typical graphics processing system. An application 2, such as a game, executing on a host processor 1 will require graphics processing operations to be performed by an associated graphics processing unit (GPU) (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

To do this, the application 2 provides the shader programs implemented using a high-level shader programming language, such as GLSL, HLSL, OpenCL, etc. These shader programs are then translated by a shader language compiler to binary code for the target graphics processing pipeline 33. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

Figure 2:
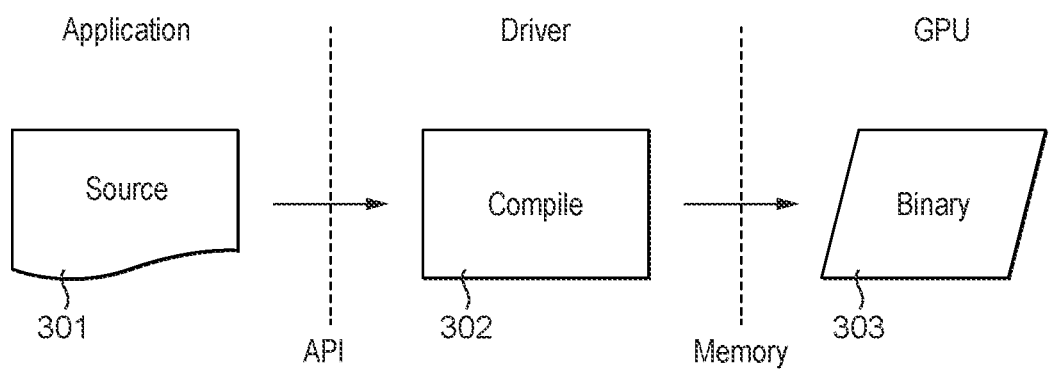
FIG. 2 shows schematically the compiling of a shader program for execution by a graphics processing pipeline.

FIG. 2 illustrates this, and shows the shader program being provided in the high level shader programming language 301 by the application 2 to the driver 4, which then compiles 302 the shader program to the binary code 303 for the graphics processing pipeline 33.

Figure 3:
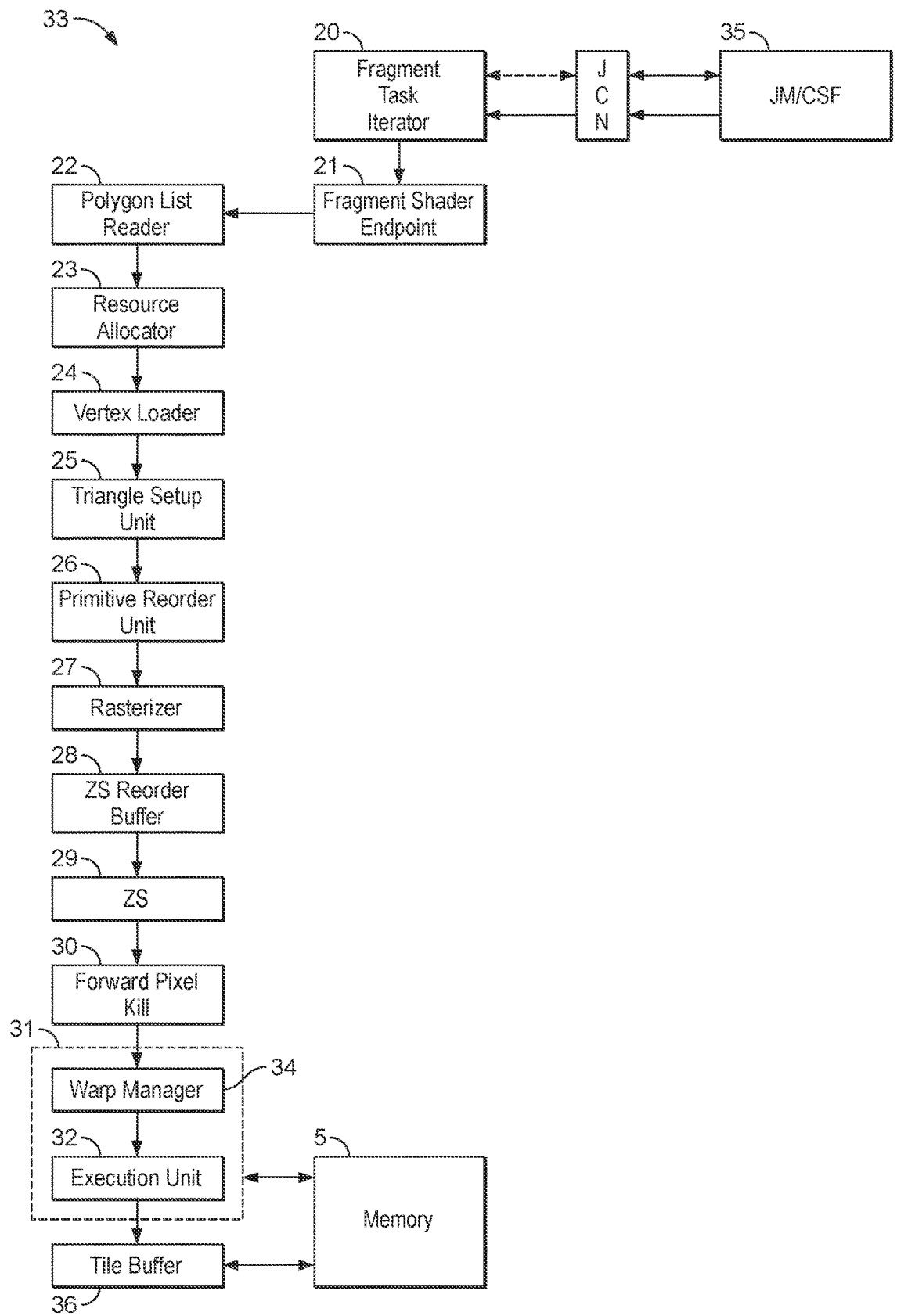
FIG. 3 shows an exemplary graphics processing pipeline within which the technology described herein can be implemented.

FIG. 3 shows an exemplary graphics processing pipeline 33 that may be executed by the graphics processor 3 in the present embodiments.

The graphics processing pipeline 33 shown in FIG. 3 is a tile-based system, and will thus produce tiles of an output data array, such as an output frame to be generated. (The technology described herein is however also applicable to other systems, such as immediate mode rendering systems.) The output data array may typically be an output frame intended for display on a display device, such as a screen or printer, but may also, for example, comprise a "render to texture" output of the graphics processor, or other suitable arrangement.

FIG. 3 shows the main elements and pipeline stages of the graphics processing pipeline 33 according to the present embodiments. As will be appreciated by those skilled in the art, there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. Equally, some of the elements depicted in FIG. 3 need not be provided, and FIG. 3 merely shows one example of a graphics processing pipeline 33. It will also be appreciated that each of the stages, elements and units, etc., of the graphics processing pipeline as shown in FIG. 3 may be implemented as desired and will accordingly comprise, e.g., appropriate circuits and/or processing logic, etc., for performing the necessary operation and functions.

The graphics processing pipeline as illustrated in FIG. 3 will be executed on and implemented by the graphics processing unit (GPU) (graphics processor) 3, which will accordingly include the necessary functional units, processing circuits, etc., operable to execute the graphics processing pipeline stages.

FIG. 3 shows the stages of the graphics processing pipeline after a tiler (not shown) of the graphics processor has prepared the primitive lists (as the graphics processing pipeline 33 is a tile-based graphics processing pipeline). Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 3.

A fragment task iterator 20 is thus provided that schedules processing work to the graphics processing pipeline 33. The fragment task iterator 20 may thus schedule the graphics processing pipeline to generate a first output, which may, e.g. be a frame to display. In the present embodiments, wherein the graphics processing pipeline 33 is a tile-based system, in which the output has been divided into a plurality of rendering tiles, the graphics processing pipeline 33 iterates over the set of tiles for the first output, rendering each tile in turn.

As shown in FIG. 3, the graphics processor 3 includes an overall controller in the form of a job manager circuit (a command stream frontend circuit) 35, that is operable to receive tasks for the graphic processor 3 for processing from the host processor 1, which job manager 35 can then communicate the relevant jobs (tasks) to respective elements of the graphics processor and graphics processing pipeline 33, via an appropriate bus/interconnect, which in the present embodiment is in the form of a job control network (JCN).

Thus, as shown in FIG. 3, the job manager 35 will, inter alia, issue fragment processing tasks to the fragment task iterator 20 for the fragment task iterator 20 to then schedule the appropriate fragment shading tasks to and onto the graphics processing pipeline 33.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 33 for processing.

A resource allocator 23 then configures and manages the allocation of memory space for the depth (Z), colour, etc., buffers 33 for the tile of the output that is being generated. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

Before the primitives are passed to the rasteriser 27 the primitives may desirably be re-ordered, e.g. to improve the rasterisation efficiency, hidden surface removal, etc. Thus, the graphics processing pipeline 33 includes a primitive re-order unit 26 containing a buffer of primitives that may be subject to re-ordering.

The edge information for the re-ordered primitives is then passed to the rasteriser 27, which rasterises the primitives into a set of one or more sampling points and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

To facilitate this, the fragments may be subject to further re-ordering in a ZS re-order buffer 28 upstream of the Z/stencil testing stage 29.

Fragments that pass the fragment early Z and stencil test stage 29 may then be subject to further culling operations, such as a 'forward pixel kill' test 30, e.g. as described in United States Patent Application Publication No. 2019/0088009 (Arm Limited), before the remaining fragments are then passed to a fragment shading stage, in the form of a shader core 31, for rendering.

The fragment shading stage 31 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs for the fragments, applying textures to the fragments, applying fogging or other operations to the fragments, etc., to generate the appropriate rendered fragment data.

In the present embodiment, the fragment shading stage is in the form of a shader pipeline (a programmable fragment shader), and thus is implemented by means of an appropriate shader (processing) core 31.

Thus, as shown in FIG. 3, in the present embodiment, the fragment shading stage (shader core) 31 includes a programmable execution unit (engine) 32 operable to execute fragment shader programs for respective execution threads (where each thread corresponds to one work item, e.g. an individual fragment, for the output being generated) to perform the required fragment shading operations to thereby generate rendered fragment data. The execution unit 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 3 accordingly also shows a thread group controller, in the form of a warp manager 34, that is configured to control the allocation of work items (e.g. fragments) to respective thread groups for the fragment shading operations to be performed by the execution unit 32, and the issuing of thread groups to the execution unit 32 for the execution of the fragment shading programs by respective thread groups.

The 'forward pixel kill' test 30 described above is operable to kill fragments that are further ahead in the graphics processing pipeline, in particular fragments that are already in-flight in the fragment shading stage 31.

Accordingly, when the 'forward pixel kill' test 30 generates a 'forward pixel kill' request, this is passed to the warp manager 34 appropriately, and the warp manager 34 is then operable to issue a terminate request to each warp specifying which thread or threads are to be killed. To facilitate this, each warp may have its own warp controller (not shown) that is able to parse such requests and determine whether or not it is to be killed.

As shown in FIG. 3, the fragment shading stage (shader core) 31 is also in communication with the memory 5.

Once the fragment shading is complete, the output rendered (shaded) fragment data is written to the tile buffer 36 from where it can, for example, be output to a frame buffer (e.g. in the memory 5) for display. The depth value for an output fragment is also written appropriately to a Z-buffer within the tile buffer 33. (The tile buffer stores colour and depth buffers that store an appropriate colour, etc., or Z-value, respectively, for each sampling point that the buffers represent (in essence for each sampling point of a rendering tile that is being processed).) These buffers store an array of fragment data that represents part (a tile) of the overall output (e.g. image to be displayed), with respective sets of sample values in the buffers corresponding to respective pixels of the overall output (e.g. each 2×2 set of sample values may correspond to an output pixel, where 4× multi-sampling is being used).

As mentioned above, the tile buffer 36 is normally provided as part of RAM that is located on (local to) the graphics processor.

Once a tile for the output has been processed, the data from the tile buffer(s) may thus be written back to an external memory output buffer, such as a frame buffer of a display device (not shown), e.g. in the memory 5. (The display device could comprise, e.g., a display comprising an array of pixels, such as a computer monitor or a printer.)

The next tile is then processed, and so on, until sufficient tiles have been processed to generate the entire output (e.g. frame (image) to be displayed). The process is then repeated for the next output (e.g. frame) and so on.

It will be appreciated that FIG. 3 merely illustrates one possible fragment processing pipeline 33 including a fragment (pixel) shader 26. However, in general a graphics processing pipeline may include a number of shaders that may be configured appropriately to perform different graphics processing operations depending on the graphics processor in question (e.g. a geometry shader, a vertex shader, etc.).

As discussed above, each shader in the graphics processing pipeline is a processing stage that performs graphics processing by running small programs for each "work" item in a graphics output to be generated (an "item" in this regard is usually a vertex, or a sampling position). For each work item to be processed, an execution thread that will execute the corresponding shader program is issued to appropriate programmable processing circuit(s) that then executes the shader program for the execution thread in question.

In such arrangements, in order to execute the execution threads of a thread group, e.g., so as to perform a fragment shading operation, the execution threads of a thread group will be appropriately issued to appropriate functional units, such as arithmetic processing units, to perform the processing operations required by the shader program in question. In the case where threads can be organised into and executed as respective thread groups of plural threads, then typically the functional units will be arranged as plural execution lanes, with each execution lane being able to perform processing operations for an execution thread of a thread group.

As such, each functional unit (or set of associated functional units) will be arranged and operable as a plurality of execution lanes, to which threads of a thread group can be issued for execution. When a thread group is to be executed, appropriate control logic will issue the relevant data and instruction to be executed to the appropriate execution lanes of a functional unit or set of functional units, so that the instruction in question can be executed for the threads of the thread group by the functional unit(s).

Figure 4:
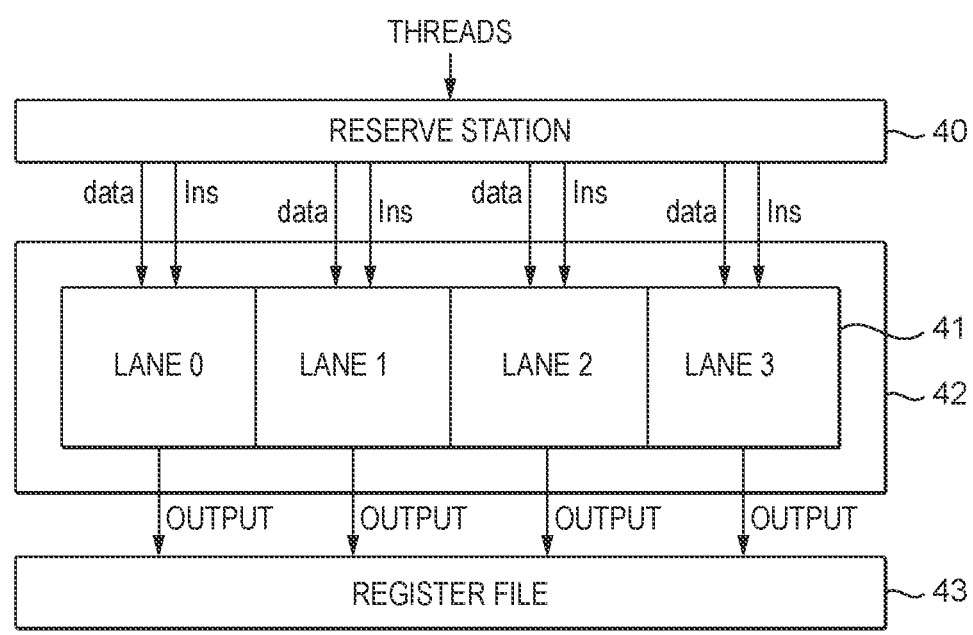
FIG. 4 shows schematically the arrangement of execution lanes within the graphics processor shader core according to an embodiment of the technology described herein.

FIG. 4 illustrates this, and shows an execution processing circuit 42 arranged as four execution lanes 41, and appropriate control logic (circuit) in the form of a "reserve station" 40 for issuing the appropriate data and an instruction for each thread of a thread group to an execution lane 41 of the set of execution lanes, according to the present embodiments. (The reserve station (control logic) 40 will receive threads for execution, e.g., from a thread spawner or a thread spawning process of the graphics processor.) It will be appreciated that in other embodiments, the execution processing circuit 42 may be arranged as fewer than or more than four execution lanes, e.g. two or eight.

The functional units may comprise, for example, one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store-type units (such as blend or store units), etc.

Each execution lane 41 of the execution processing circuit 42 also has access to (and available to it) a set of plural registers 43 for storing data values associated with and for the execution lane (i.e. for storing data values being processed for the execution thread that the execution lane is currently executing). This then facilitates the handling of execution threads and their data values in an execution lane without the need to (always) require access to memory (to the memory system of the graphics processing system). The registers for the execution lanes can be arranged in register file banks, as desired, and as appropriate.

Figure 5:
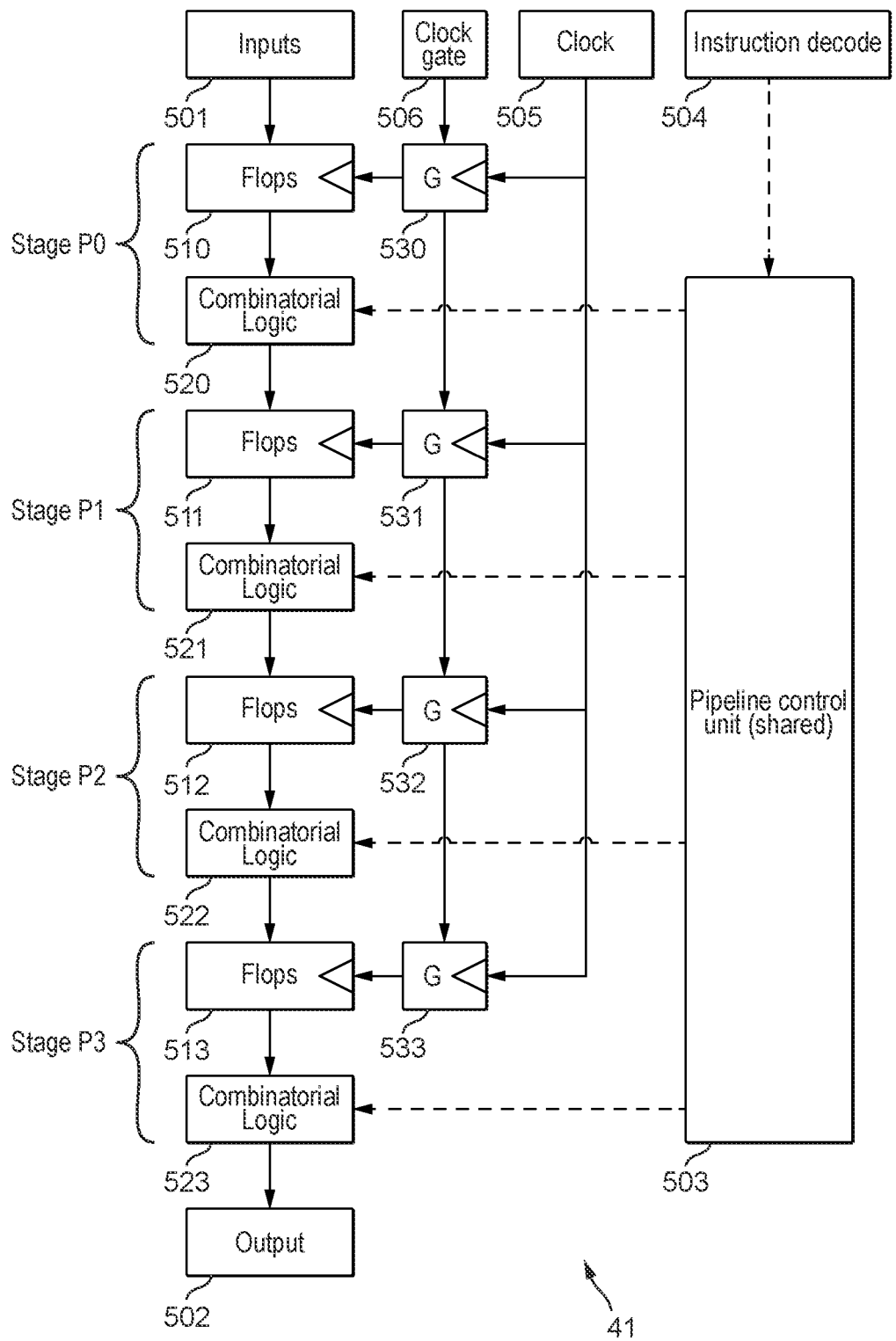
FIG. 5 shows schematically the arrangement of an execution lane pipeline within the graphics processor shader core according to an embodiment of the technology described herein.

FIG. 5 shows in more detail an execution lane 41 in the form of an arithmetic unit pipeline of a graphics processor 3, which can perform arithmetic processing operations for an execution thread that has been issued to it for execution by control logic 40, according to the present embodiment.

The pipeline 41 of FIG. 5 is operable to perform a graphics processing operation on an input data value, and then provide the result of the processing operation as an output data value. The input data value is stored as a binary data value in an input register 501, and the output data value is stored as a binary data value in an output register 502.

The processing operation that the pipeline is operable to perform can be any suitable processing operation, and in the present embodiment is performed as a series of four processing operations. Thus, as shown in FIG. 5, in the present embodiment, the pipeline 41 is arranged as a pipeline (series) of four arithmetic processing stages P0-P3, with each arithmetic processing stage P0-P3 being operable to execute one instruction during a cycle of clock 505. It will be appreciated that in other embodiments, the "depth" of the pipeline may be fewer or more than four processing stages, such as two or eight processing stages.

As shown in FIG. 5, at each processing stage P0-P3, a binary data value stored in flip-flops (latches) 510-513 is provided as an input to a combinatorial logic circuit 520-523 (functional unit), and the combinatorial logic circuit 520-523 (functional unit) then performs an e.g. arithmetic operation on the input to produce a binary output. The output of a combinatorial logic circuit 520-523 may then be stored in flip-flops (latches), and may be provided as the input to the next stage (functional unit), and so on. The final output data value of the pipeline is the output of the combinatorial logic circuit 523 (functional unit) of the final stage P3 of the pipeline 41.

As shown in FIG. 5, the pipeline (execution lane) 41 is operated under the control of a pipeline control unit 503, which indicates to the combinatorial logic circuit 520-523 (functional unit) at each stage P0-P3 the operation that is to be performed during a clock cycle, e.g. by issuing appropriate opcodes to the combinatorial logic circuits 520-523. The pipeline control unit 503 is in turn controlled by instruction decode circuit 504, which operates to decode an instruction in the shader program being executed, and to cause the pipeline control unit 503 to control the pipeline (execution lane) 41 to perform the required graphics processing operation(s) to execute the shader instruction in question.

The pipeline 41 may also include clock gates 530-533 for performing clock gating, under the control of clock gate control circuit 506, as will be discussed further below.

FIG. 5 shows only a single execution lane 41 in detail for the sake of clarity. However, in the present embodiment, the execution processing circuit 42 is arranged as four execution lanes 41, with the instruction decode circuit 504 and pipeline control circuit 503 then being shared across the four execution lanes 41 collectively, such that a single instruction in the shader program is decoded, and then executed by all of the four execution lanes in a given cycle. Thus, instructions in the shader program are executed over a physical SIMD (single instruction, multiple data) arithmetic data path.

Figure 6:
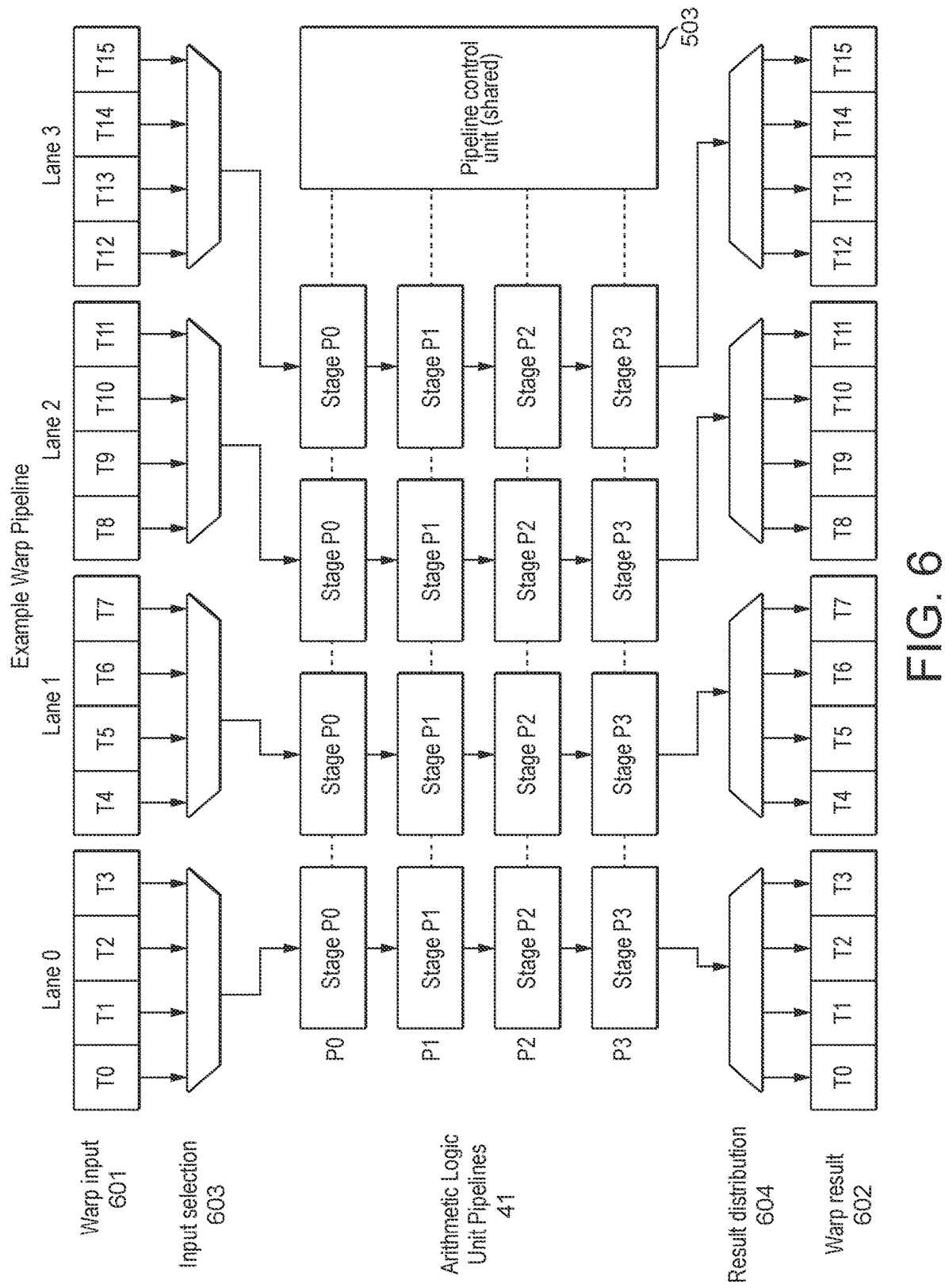
FIG. 6 shows schematically the arrangement of execution lane pipelines in embodiments of the technology described herein.

This is illustrated in FIG. 6. As shown in FIG. 6, in the present embodiment, the execution processing circuit 42 is arranged as four execution lanes, Lane0-Lane3, which are provided by four arithmetic unit pipelines 41, each comprising four stages P0-P3, which operate under the control of the (shared) pipeline control circuit 503, as discussed above with reference to FIG. 5.

As discussed above, it may typically be the case that threads are arranged into groups ("warps") that match the number of execution lanes that are provided, in which case (in arrangements not forming part of the technology described herein) each thread within a thread group can be issued to a respective one of the execution lanes for execution, i.e. such that an execution lane has only one execution thread from a thread group ("warp") issued to it. Such arrangements can allow each shader program instruction to be executed for all threads in a thread group in a single cycle, such that single-threaded execution performance can be increased, for example.

The present embodiments relate to systems where threads that are to execute a shader program can be organised into groups ("warps") of threads that can be used to perform processing operations together in a 'co-operative', e.g. single instruction, multiple data (SIMD), execution state.

In the present embodiments the execution unit is caused to enter this co-operative state using an instruction, referred to herein as an "enter SIMD state" instruction that when executed will cause all of the execution lanes to be active and in the required co-operative state for performing the SIMD execution processing. Thus, when the "enter SIMD state" instruction is executed, all of the execution lanes are then brought into the co-operative state. At this point, all of the execution lanes are then active and performing the same operations (for the same part of the program), in a co-operative manner.

The desired SIMD processing operations can then be performed using the group of execution lanes as a whole. Once the SIMD processing operations have finished, an appropriate 'exit_SIMD_state' instruction can then be executed that causes the execution lanes to return to their previous execution state. Thus, after the SIMD processing is finished, the execution lanes are returned to their original execution state.

Figure 7:
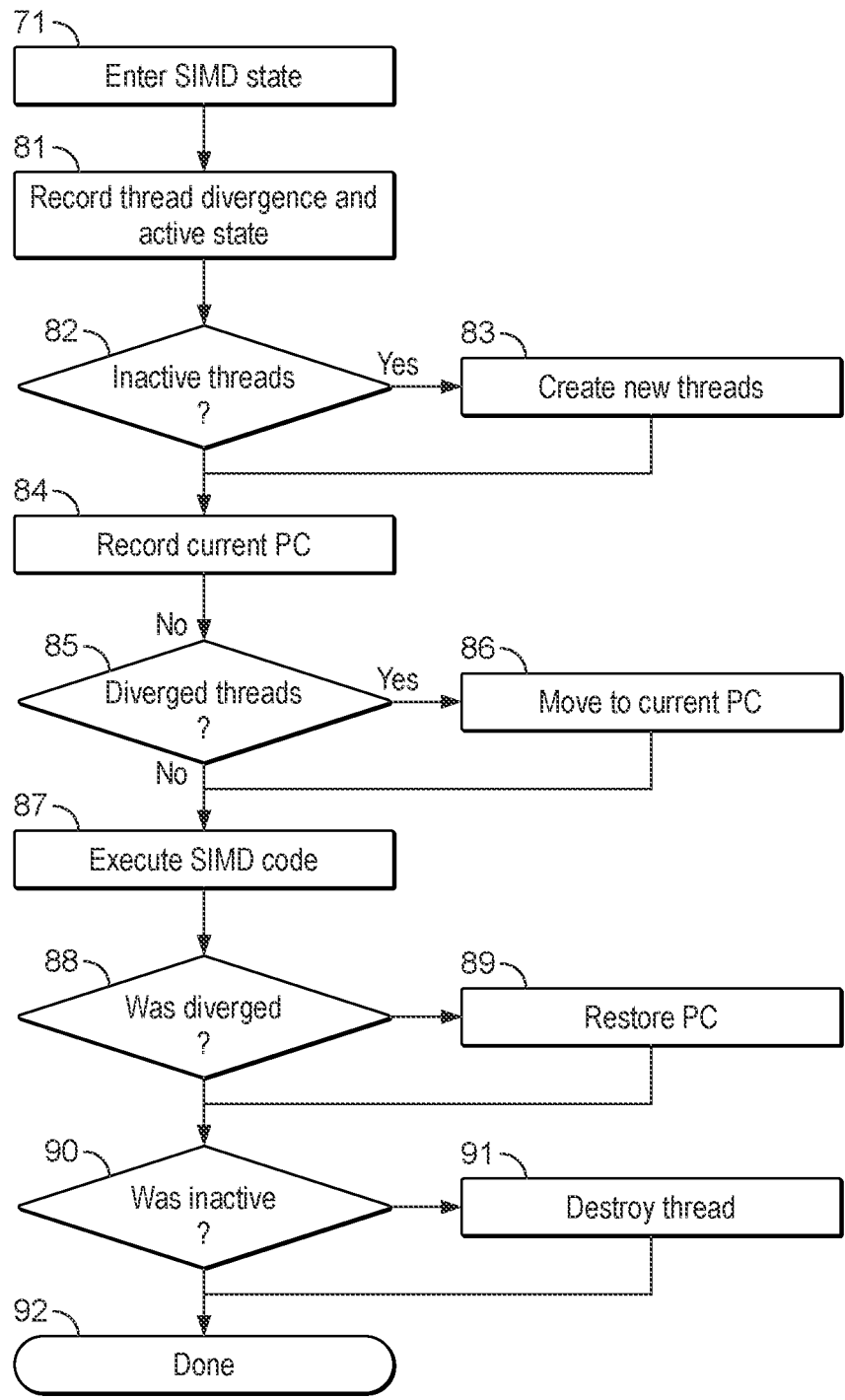
FIG. 7 shows the operation of the graphics processor when entering the co-operative state according to embodiments of the technology described herein.

FIG. 7 shows in more detail the operation according to the present embodiments in response to the "enter SIMD state" instruction being executed (step 71). Depending on the execution state of an execution lane at the point at which the "enter SIMD state" instruction is executed, different operations may need to be performed, e.g. in order to allow the execution threads to return to their previous execution state after the SIMD processing operations have finished.

Accordingly, for each execution lane, the execution state i.e. is the execution thread in the execution active or not active, has there been a divergence, etc., is recorded (step 81).

It is then determined whether there any execution lanes are inactive execution threads (step 82). If so, in order to bring the execution lane into the desired active state for the SIMD processing operations, a new execution thread is generated in that execution lane (step 83). The execution thread can then be suitably initialised for the SIMD processing operations, e.g. with a set of zero values. An indication that the execution lane was inactive is also stored and carried through the SIMD processing operations.

For any active threads, the current program counter is stored (step 84) in order to allow the execution threads to return to their current position once the SIMD processing operations have finished.

Likewise, for any diverged threads (step 85), the current program counter is stored, and the diverged thread is then moved to the current program counter (step 86) for the program that requires the SIMD processing operations.

At this point all of the execution lanes are in the desired active state for performing the SIMD processing operations and the SIMD processing operations can be performed accordingly using the whole warp in SIMD state (step 87).

After the SIMD processing operations have finished, the threads can then be returned to their previous execution state. As mentioned above, this is in an embodiment done by executing an appropriate 'exit_SIMD_state' instruction (step 73 in FIG. 7) that causes all of the execution threads to exit the active SIMD state together. In response to executing the exit_SIMD_state' instruction, the execution threads can then be returned to their previous execution state.

Thus, for any threads that were diverged (step 88), their program counter is restored (step 89), and their previous program execution can continue. Likewise, any threads that were already active can continue their program execution. On the other hand, for any threads that were inactive at the point at which the "enter SIMD state" instruction was executed (step 90), the thread can be destroyed (step 91).

The SIMD processing is then completed and the program execution can continue as desired (step 92).

The present embodiments in particular relate to situations where it is desired to terminate individual execution threads when the execution processing circuit 42 is operating in such co-operative (SIMD) execution state.

For instance, within a graphics processor there are various events that may mean that threads can and therefore be terminated early. An example of this would be when executing a fragment shader where the fragment that an execution thread is processing is occluded by another fragment in the graphics processing pipeline. Such fragment culling operations may for example include early depth testing (stage 29 in the graphics processing pipeline 33 in FIG. 3) and/or forward pixel kill operations (stage 30 in the graphics processing pipeline 33 in FIG. 3). However, there are various other examples of fragment culling operations that may trigger thread termination events. Other specific examples are described for example in U.S. Pat. No. 10,748, 236 (Arm Limited) which is incorporated herein by reference in its entirety.

There may of course also be other thread termination events that do not correspond to such fragment culling operations. For example it may be the case that the application 2 executing on the host processor 1 that is using the graphics processor switches its output in which case all of the current threads (and processing work) for the current render output could be discarded. Various other arrangements would be possible.

In the present embodiments, when the graphics processor encounters such thread termination events during an instance of SIMD processing, it may not be possible to immediately terminate the thread, e.g. as its respective execution lane is busy performing the "co-operative" processing operations, and must generally remain active until these are finished. Rather than just ignoring any thread termination events that take place when the execution unit is operating in SIMD state, in the present embodiments a record is kept of any threads that should be terminated, such that they can be terminated appropriately, e.g. when the SIMD state operations finish.

To do this, suitable thread termination management circuitry is provided that is able to determine whether or not a thread can be immediately terminated, and if not, to store and manage a record of threads that should be terminated so that these threads can be terminated at an appropriate point.

Figure 8:
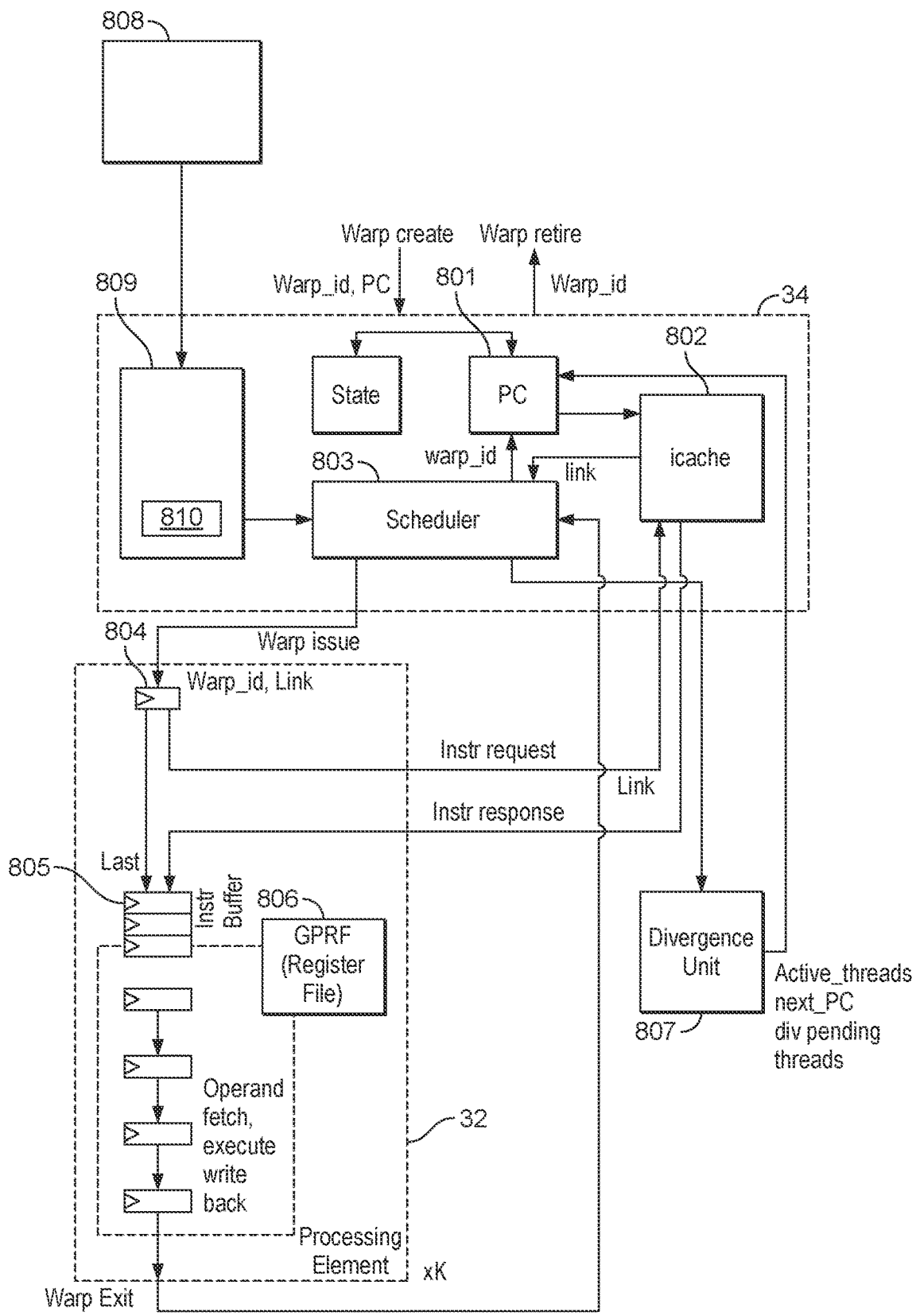
FIG. 8 shows schematically the operation of a graphics processor shader core according to embodiments of the technology described herein.

FIG. 8 shows an embodiment of a graphics processor shader core execution unit (which may, e.g., function as the execution unit 32 of fragment shading stage 31 in the graphics processing pipeline shown in FIG. 3, but may also function as a compute shader core, or as any other form of shader core, as required) in more detail.

In particular, FIG. 8 shows the flow of a thread group inside the execution engine from thread group creation to retirement.

As shown in FIG. 8, when a thread group is spawned ('warp_create'), an initial program counter (PC) 801 in the warp manager 34 is initialised to point to the beginning of a respective shader program. Any thread group state can be also be configured at this point.

The warp manager 34 will then check if the PC 801 hits in the instruction cache 802 and gets back a link to the cache line and offset to the instruction. If it doesn't hit, the spawned thread group will wait until the instructions are loaded into the instruction cache 802.

When the instructions for the shader program that the thread group is spawned for are present in the instruction cache 802, the thread group execution controller (scheduler) 803 then issues the thread group to a processing element (execution unit) 32 to execute the instructions in the shader program ('warp_issue').

When the processing element (execution unit) 32 receives a thread group, an instruction fetcher 804 will start requesting instructions from the instruction cache 802 ('Instr_request') using the link provided (and incrementing the offset for each fetched instruction). The fetched instruction data is then received back from the instruction cache 802 ('Instr_response') and placed into an instruction execution buffer 805.

The processing element (execution unit) fetches instructions from the instruction execution buffer 805, and then processes the instructions appropriately, e.g. by fetching the relevant operands, performing any desired (arithmetic) operations, etc., and then writing back the result of the processing to its register file 806. The registers are kept in an operand buffer (not shown). When the thread group is evicted, its registers start to getting written back to the register file.

As threads may diverge during the program execution a divergence unit 807 is also provided for managing this operation.

In the present embodiments the warp manager 34 further comprises a thread termination manager 809 that is operable to monitor thread termination events in the manner of the technology described herein. Thus, as shown in FIG. 8, the thread termination manager 809 receives indications that threads should be terminated from a thread termination circuit 808 (which in FIG. 8 is shown as being external to the shader core and may, e.g., correspond to a forward pixel kill stage 30, as shown in FIG. 3).

The thread termination manager 809 then determines whether or not a thread can be immediately terminated. For instance, if the thread is not currently executing in SIMD state, it can be terminated immediately. However, if the thread is currently executing in SIMD state, it may not be possible to terminate immediately, and this is determined by the thread termination manager 809. Any threads that should be terminated but cannot be terminated immediately are added to a record 810 that is maintained by the thread termination manager 809 and that allows the threads to subsequently be terminated, i.e. when it is possible to do so.

Figure 9:
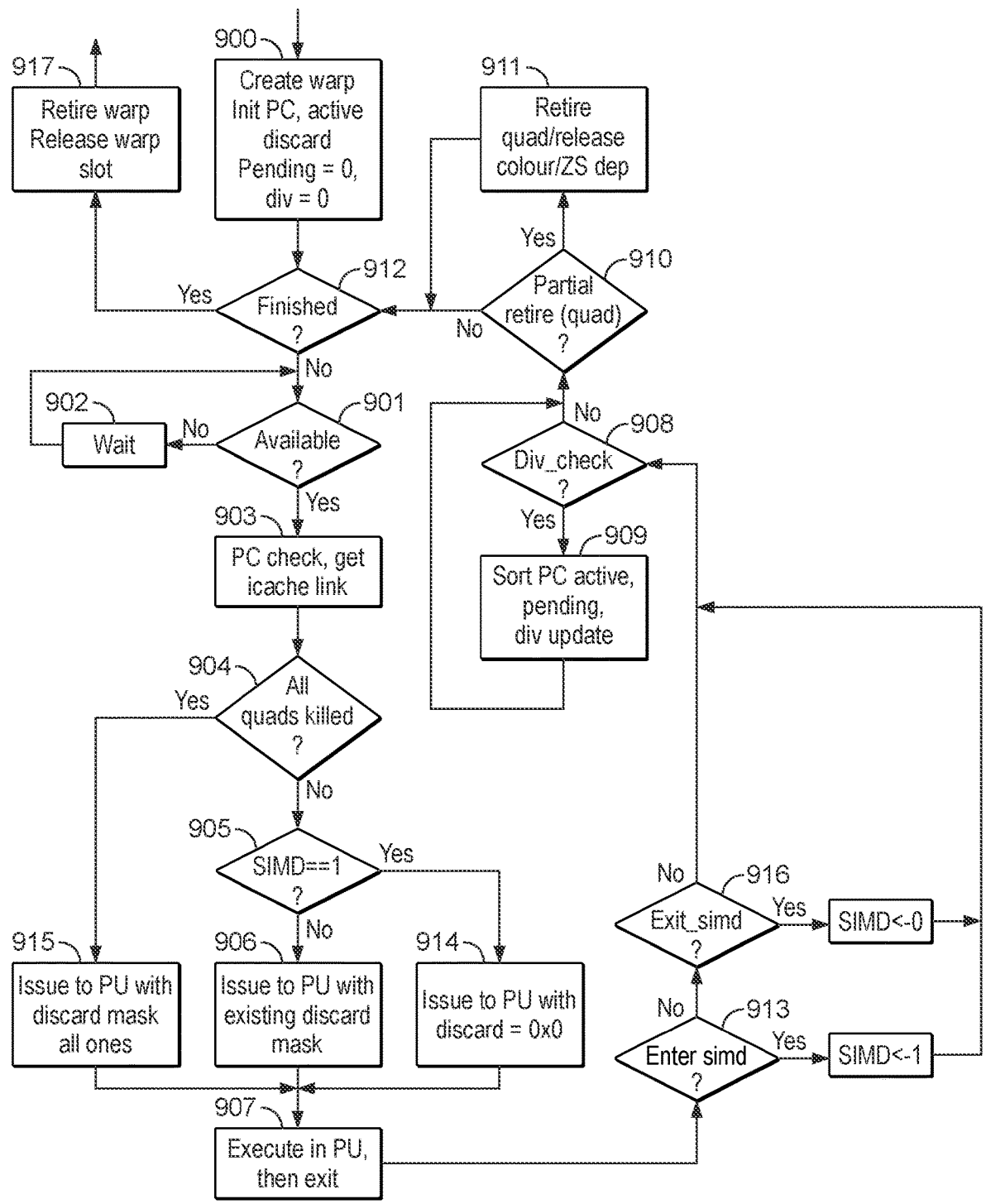
FIG. 9 is a flow chart showing the overall operation according to an embodiment of the technology described herein.

FIG. 9 is a flow chart illustrating the overall operation according to the present embodiment.

The operation starts (step 900) with the creation of a warp that contains a plurality of execution threads that represent a number of graphics fragments. In particular, in the present embodiment, the graphics fragments may be processed as sets of four graphics fragments ('quads") with four execution threads therefore being provided for each quad.

As described above, the initial program counter is thus set appropriately. At this point all of the threads in the warp will typically be active as the program execution has not yet started and so the threads cannot have diverged. The warp manager 34 then checks whether the instructions for the shader program that the thread group is spawned for are present in the instruction cache (step 901) and waits (step 902) until they are available. Once the instructions are available (step 901—yes), the thread group execution controller (scheduler) checks the program counter and fetches the instruction link from the instruction cache (step 903).

At this point it is checked whether any of the quads have been killed, e.g. in response to an external thread (quad) termination event (step 904). If less than all of the quads have been killed, then at this point the execution unit is not operating in SIMD state (step 905—no) and so the thread group is issued to the execution unit with its existing discard mask (step 906). The thread group then executes the instruction in the execution unit (step 907).

At some point the program execution may diverge and so a divergence check is performed (step 908). If there is a divergence (step 908—yes), the divergence unit sorts the program counters appropriately so that program execution can continue from the lowest program counter, and sets any other diverged threads into a pending state (step 909). If there is no divergence (step 908—no) it is then checked whether any quads can be retired (step 910) (with the quads being retired if so, at step 911). If not, assuming there are more instructions in the program (step 912—no), the execution continues with fetching the next instruction, and so on, as shown in FIG. 9.

At some point, one or more quads may be killed and the discard mask may be set appropriately. For instance, if less than all of the quads are killed (step 904—no), then so long as the execution unit is not in SIMD state (step 905—no), the thread group will be issued to the execution unit with the discard mask set appropriately to indicate that those one or more quads should be killed, and these quads are then retired appropriately (at steps 910 and 911), thereby releasing any outstanding inter quad dependencies (e.g. depth/stencil or colour dependencies) to allow other warps to proceed.

If all of the quads are killed (step 904—yes), the shader program finishes (step 912—yes) and the warp can be retired (step 917).

The above describes the operation when the execution unit is executing in its normal, non-SIMD state. At some point, an execution thread in the warp may encounter an enter SIMD state instruction (step 913). This will set a SIMD indicator accordingly (to 1). The execution then continues in SIMD state, as shown in FIG. 9. For instance, the threads may still diverge in SIMD state, and so the divergence checks (step 908) may be performed in the same way. However, in the present embodiment, quads are not partially retired in SIMD state (so step 910 will always give a negative result when in SIMD state).

In response to a thread termination event that takes place during SIMD state execution, if less than all of the quads are killed (step 904—no), because the SIMD indicator is now set (step 905—yes), the thread group is issued to the execution unit with a zero discard mask (step 914). This means that when the thread group is executed in the execution unit the threads are all kept active, such that the quad is not killed.

In other words, the SIMD operation overrides the actual lane masks in order to keep all of the lanes active for SIMD processing operations. Instead, a separate record that the quad should subsequently be killed is maintained, e.g. by the thread termination manager as shown in FIG. 8.

The execution then continues in SIMD state with all of the lanes active. If all of the quads are killed in SIMD state (step 904), then the quads can be killed, with SIMD state exiting early to allow the quads to be killed and the warp to be retired, in the same manner described above. On the other hand, if less than all of the quads are killed, the execution in SIMD state will continue until the program reaches an exit SIMD state instruction (step 916) to cause the threads to exit the SIMD state. At this point the SIMD override is stopped (at step 905) so the thread group can be issued for execution with the actual discard mask (e.g. as was stored in the record during the SIMD state) to cause those quads to be retired.

Assuming there are still some active quads, the program execution then continues appropriately until the shader program has finished (step 912—yes), at which point the warp can be retired (step 917). The warp slot can thus be released and a new thread group generated in its place.

Various examples will now be provided to illustrate the various operations according to the present embodiments.

Example 1

A first example illustrates creating a warp with four threads (e.g. representing a set of four graphics fragments, i.e. a 'quad'). Thus, at time t0, a warp is created by the thread group execution controller (scheduler) circuit.

In the next cycle, at time t1, the created warp is then issued to the processing unit with initial state masks/values as follows:

Active=1111 (indicating that all of the threads are active)
Pending=0000 (indicating that none of the threads are pending)
Divergence=0 (indicating that there is no program divergence)
SIMD=0 (indicating that the warp is not in SIMD state)
Valid=1111 (indicating that none of the threads have been terminated)
Discard=0000 (indicating that none of the threads should be terminated)

In this first example, the shader program is as follows, and includes a branch instruction at line 16 of the shader program:

Shader
0: i0
8: i1
16: i2 BRANCH src0, target
24: i3
32: i4.reconv
target 40: i5.end Thus, the shader program starts executing instructions until the branch instruction is reached, at time t2, at which point the program execution diverges and requires sorting. For instance, the upper three threads may continue executing the program from line 16 of the shader program, whereas the lower thread may diverge at this point with its next instruction being at line 40 of the shader program. The per lane program counters may be stored in general purpose register files for the lanes.

A terminate mask can also be calculated (e.g. on warp exit). At this stage, the terminate mask will be as follows:
Terminate=0000 (indicating the warp should not be retired)

The divergence unit then sorts the threads to select the minimum program counter, and execution then continues with execution from that point (in this example from line 24 of the shader program).

In this example the upper three threads remain active with the lower thread, which has diverged, being set into a pending state. However, all of the threads are still valid, as none have been terminated at this point. Thus, the state masks/values at this point are as follows:

Active=1110 (indicating that the upper three threads are active)
Pending=0001 (indicating that the lower thread is pending)
Divergence=1 (since the lower thread has diverged)
SIMD=0
Valid=1111
Discard=0000
The terminate mask is as follows:
Terminate=0000

The warp is then issued back to the processing unit where the upper three threads execute on a common program counter until the re-convergence point at line 40 of the shader program is reached. Then another sorting is performed (in the divergence unit) to detect that the threads have re-converged.

This is then issued in full convergence to the processing unit and execution continues until the program reaches the end of the shader. At that point the warp is evicted by setting the terminate mask to '1111', which causes the thread group execution controller (scheduler) to retire the warp and release the warp slot.

Example 2

In the first example described above, there are no thread termination events and no execution in SIMD state. The first example thus effectively illustrates a 'normal' shader operation including a divergence.

The second example therefore illustrates what happens in the present embodiment when a thread termination event takes place during SIMD state execution.

In the second example, the thread group ("warp") contains two quads. So, a warp is created by the scheduler with all lanes active and zero (uncovered) discarded threads. The initial state masks/values in the second example are thus as follows:
Active=1111_1111 (indicating that all threads in both quads are active)
Pending=0000_0000 (indicating no threads for either quad are pending)
Divergence=0
SIMD=0
Valid=1111_1111 (indicating that all threads are valid)
Discard=0000_0000 (indicating that no threads should be terminated)
In the second example, the shader program is as follows:
Shader
0: i0
8: i1
16: i2 BRANCH src0, target
24: i3 ENTER_SIMD r0, simd_kernel
32: i4
40: i5.reconv
target 48: i6.end
simd_kernel 200: i10
208: i11
. . .
304: i20 EXIT_SIMD r0

Again, the shader program includes a branch instruction at line 16. The program execution thus starts with the common program counter at zero and all of the threads execute until the branch instruction is encountered. When the branch instruction is encountered, the threads diverge and require sorting, as in the first example. In this example, the lowest thread in the second quad diverges. A divergence value is thus set accordingly and the active/pending masks are updated to indicate that the lowest thread in the second quad is no longer active/is pending. Thus, the state and terminate masks/values at this point are:
Active=1111_1110
Pending 32 0000_0001
Divergence=1
SIMD=0
Valid=1111_1111
Discard=0000_0000
Terminate=0000_0000

The upper seven threads then execute from the common program counter at line 24. At some point, the threads encounter an 'enter_SIMD_state' instruction (e.g. as illustrated in FIG. 7). All of the threads are thus brought back into an active state for the SIMD operations (i.e. the active lane mask is re-purposed to this effect) and the program execution branches to a SIMD kernel (at line 208 of the program). Thus, at this point the state and terminate masks/values are as follows:
Active=1111_1111 (since all of the threads are now active in SIMD state)
Pending=0000_0000
Divergence=0 (since all of the threads are acting in common in SIMD state)
SIMD=1 (indicating that the warp is now in SIMD state)
Valid=1111_1111
Discard=0000_0000
Terminate=0000_0000

During the SIMD state, in the second example, the first quad ('quad 0') is killed, e.g. in response to a forward pixel kill event. However, in the present embodiment the quad is not terminated immediately at this point, as the execution unit is currently in SIMD mode (SIMD=1), and the active lane mask has been re-purposed for this to keep all of the lanes active for the SIMD operations, with no divergence. All of the lanes should thus remain active and the SIMD state therefore overrides the thread termination event, such that the valid and discard masks are not updated at this point, but instead a separate record is stored reflecting the actual state of the discard mask, i.e. indicating that the first quad should eventually be killed.

The record at this point thus stores respective bit values for each of the quads, e.g.=1_0 (indicating that the first quad should subsequently be killed when it is possible to safely do so, but the second quad should not be killed).

The state masks/values at this point however remain as above, i.e. as follows:
Active=1111_1111
Pending=0000_0000
Divergence=0
SIMD=1
Valid=1111_1111
Discard=0000_0000

The execution of the SIMD kernel thus continues accordingly until an 'exit_SIMD_state' instruction is reached. This instruction retries the stored state at the point of entering SIMD state and restores the (stored in GPRF) PC per thread correctly. A special divergence sort is then performed to recover the state as if it was when we were entering SIMD: PC={32, 32, 32, . . . 32, 48}. The SIMD value is thus re-set accordingly to 0.

Program execution then continues with the next line (PC=32) accordingly, with the state masks being returned to their previous form (Active=1111_1110, Pending=0000_0001, Divergence=1). The discard record (1_0) is then loaded in and used to generate the new discard mask (Discard=1111_0000).

At this point the execution unit is no longer in SIMD state, and the first quad can now be killed, and so the terminate mask is set appropriately to 1111_0000. The state and terminate masks/values at this point are thus as follows:

Active=1111_1110
Pending=0000_0001
Divergence=1
SIMD=0
Valid=0000_1111 (indicating that the first quad is no longer valid)
Discard=1111_0000 (indicating that the first quad can be killed)
Terminate=1111_0000

This has the effect of terminating the lanes for the first quad. The Active mask is thus set to 0000_1110 and the Pending mask set to 0000_1110. At some point the program execution re-converges and all the remaining threads reach the end of the shader together (Active=0000_1111 and Pending=0000_0000).

At that point, the terminate mask is calculated as 0000_1111 to terminate the second quad and cause the scheduler to retire the warp to release the warp slot for a new warp.

Note that the effect of the SIMD state is that the thread termination for the first quad is not performed immediately and is instead handled at SIMD state exit. Otherwise, if the forward pixel kill event had occurred when the execution unit was not in SIMD state, the killing of the quad would have immediate effect.

Example 3

The third example is the same as the second example, except that in this example, after the first thread termination (e.g. forward pixel kill) event that kills the first quad, but is not immediately performed due to the SIMD state processing, a second thread termination (e.g. forward pixel kill) event takes place that kills the second quad. In that case both quads are killed during the SIMD state processing. Since all of the quads can be terminated, the SIMD state processing can thus be exited early to retire the warp.

Thus the operation up to and including the first thread termination (e.g. forward pixel kill) event is the same as in the second example above. Thus, at this point the state and terminate masks/values are as follows:

Active=1111_1111
Pending=0000_0000
Divergence=0
SIMD=1
Valid=1111_1111
Discard=0000_0000
Terminate=0000_0000

However, whilst still in the SIMD state, a second thread termination (e.g. forward pixel kill) takes places that kills the second quad. At that point, all of the quads can be killed. The condition is thus met to terminate all of the threads. The discard mask can thus be updated accordingly, such that the state of the masks is as follows:

Active=1111_1111
Pending=0000_0000
Divergence=0
SIMD=1
Valid=1111_1111
Discard=1111_1111 (indicating that both quads can be killed)

Based on the discard mask being set for both quads, the terminate mask for terminating the thread group can then be set accordingly (Terminate=1111_1111) to cause the threads to exit SIMD state to allow the whole thread group to be retired.

Various other examples would be possible.

As will be appreciated from the examples above, the present embodiments thus provide an efficient mechanism for dealing with such thread termination events even when the execution unit is in a "co-operative" (e.g. SIMD) execution state that means that it may not be possible to immediately terminate individual threads, e.g. since the all of the threads may need to remain active until the "co-operative" processing operations have finished.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor that comprises a programmable execution unit operable to execute programs to perform graphics processing operations,
   wherein the execution unit is configured as a plurality of execution lanes, wherein individual execution threads in a group of plural execution threads are executed by respective execution lanes, and wherein a group of plural execution lanes can be caused to execute in a co-operative state in which processing operations are performed using the plural execution lanes together,
   wherein the graphics processor is arranged such that there are certain events that when encountered mean that individual subsets of one or more threads within a group of plural execution threads being executed by the execution unit should be terminated;
   the method comprising:
   the execution unit executing a group of plural execution threads for a graphics processing program, wherein as part of the program execution, in response to an execution thread in the group of plural execution threads encountering within its respective part of the program a set of processing operations that are to be performed by a group of execution lanes in a co-operative state, a group of execution lanes is caused to enter the co-operative state to perform the set of processing operations; and
   when the group of plural execution lanes are performing the set of processing operations in the co-operative state, in response to the graphics processor encountering an event that means that a subset of one or more execution threads associated with a corresponding one or more of the execution lanes in the group of execution lanes in the co-operative state should be terminated:
   determining whether a condition to immediately terminate the subset of one or more execution threads is met, and wherein when such condition is not met, the group of execution lanes continue their execution in the co-operative state, and the method comprises storing a record that the threads in the subset of one or more execution threads should subsequently be terminated.

2. The method of claim 1, wherein the event that means that a subset of one or more execution threads associated with a corresponding one or more of the execution lanes in the group of execution lanes in the co-operative state should be terminated is an event that takes place externally to the execution unit and/or independently of the execution of the execution thread itself.

3. The method of claim 2, wherein the graphics processing program that is performed by the execution unit corresponds to a fragment shader program that is being executed as part of a graphics processing pipeline, wherein individual execution threads process respective fragments, and wherein the event that means that a subset of one or more execution threads should be terminated corresponds to a fragment culling operation from another stage in the graphics processing pipeline, the fragment culling operation indicating that a respective one or more fragment(s) can be culled, and thereby indicating that the corresponding execution threads for the one or more fragment(s) to be culled should be terminated.

4. The method of claim 1, wherein the event that means that a subset of one or more execution threads associated with a corresponding one or more of the execution lanes in the group of execution lanes in the co-operative state should be terminated is a global thread termination event that means that all of the execution threads in the execution thread group should be terminated.

5. The method of claim 1, wherein the condition to determine whether to immediately terminate the subset of one or more threads is whether or not all of the threads in the thread group should be terminated, wherein the condition is met such that an execution thread can be terminated immediately only when all of the threads in the thread group can be terminated.

6. The method of claim 1, comprising:
when the group of plural execution lanes are performing the set of processing operations in the co-operative state: the graphics processor encountering a first event that means that a first subset of one or more execution threads associated with a corresponding one or more of the execution lanes in the group of execution lanes in the co-operative state should be terminated, but wherein the condition to immediately terminate the first execution thread is not met, such that the group of execution lanes continue their execution in the co-operative state, and a record is stored that the threads in the first subset of one or more execution threads should subsequently be terminated; and
whilst the group of plural execution lanes are continuing to perform the set of processing operations in the co-operative state: in response to the graphics processor encountering a second event that means that a second subset of one or more execution threads associated with a corresponding one or more other of the execution lanes in the group of execution lanes in the co-operative state should be terminated: determining whether a condition to immediately terminate the first and second subsets of execution threads is met, and when the condition to immediately terminate the first and second subsets of execution threads is met, the group of execution lanes exiting the co-operative state and the execution unit terminating the first and second subsets of execution threads.

7. The method of claim 1, wherein when it is not possible to terminate a subset of one or more execution threads that should be terminated when the group of execution lanes are in the co-operative state, such that a record for that subset of one or more execution threads is stored, the method further comprises: terminating the execution threads in the subset of one or more execution threads once the set of processing operations being performed by the group of execution lanes in the co-operative state has finished and the group of execution lanes has exited the co-operative state.

8. The method of claim 1, wherein the method comprises the group of execution lanes being caused to be in the co-operative state in response to an execution thread in the execution thread group executing an activation instruction to cause the group of execution lanes to be in the co-operative state, wherein in response to executing the activation instruction all of the execution lanes are caused to be in an active state regardless of their previous execution state, and wherein an indication of previous execution state is stored to allow lanes to return to their previous execution state when the co-operative state operations have finished.

9. The method of claim 1, wherein the co-operative state is a single instruction, multiple data execution state.

10. A non-transitory computer readable storage medium storing software code that when executing on a data processor performs a method of operating a graphics processor that comprises a programmable execution unit operable to execute programs to perform graphics processing operations,
wherein the execution unit is configured as a plurality of execution lanes, wherein individual execution threads in a group of plural execution threads are executed by respective execution lanes, and wherein a group of plural execution lanes can be caused to execute in a co-operative state in which processing operations are performed using the plural execution lanes together,
wherein the graphics processor is arranged such that there are certain events that when encountered mean that individual subsets of one or more threads within a group of plural execution threads being executed by the execution unit should be terminated;
the method comprising:
the execution unit executing a group of plural execution threads for a graphics processing program, wherein as part of the program execution, in response to an execution thread in the group of plural execution threads encountering within its respective part of the program a set of processing operations that are to be performed by a group of execution lanes in a co-operative state, a group of execution lanes is caused to enter the co-operative state to perform the set of processing operations; and
when the group of plural execution lanes are performing the set of processing operations in the co-operative state, in response to the graphics processor encountering an event that means that a subset of one or more execution threads associated with a corresponding one or more of the execution lanes in the group of execution lanes in the co-operative state should be terminated:
determining whether a condition to immediately terminate the subset of one or more execution threads is met, and wherein when such condition is not met, the group of execution lanes continue their execution in the co-operative state, and the method comprises storing a record that the threads in the subset of one or more execution threads should subsequently be terminated.

11. A graphics processor comprising:
a programmable execution unit operable to execute programs to perform graphics processing operations, wherein the execution unit is configured as a plurality of execution lanes, wherein individual execution threads in a group of plural execution threads can be executed by respective execution lanes, and wherein a group of plural execution lanes can be caused to be in a co-operative state in which the group of plural execution lanes perform processing operations together;

a thread termination circuit that is operable to cause individual subsets of one or more threads within a group of plural execution threads being executed by the programmable execution unit to be terminated; and a thread termination management circuit that is configured such that when a group of plural execution lanes are performing a set of processing operations in a co-operative state, in response to the thread termination circuit determining that a subset of one or more execution threads associated with a corresponding one or more of the execution lanes in the group of execution lanes in the co-operative state should be terminated, the thread termination management circuit determines whether a condition to immediately terminate the subset of one or more execution threads is met, and wherein when such condition is not met, the group of execution lanes is allowed to continue their execution in the co-operative state, and the thread termination management circuit stores a record that the threads in the subset of one or more execution threads should subsequently be terminated.

12. The graphics processor of claim 11, wherein the thread termination circuit is external to the execution unit and/or is operable to terminate a subset of one or more execution threads independently of the execution of the execution threads in the subset of one or more execution threads.

13. The graphics processor of claim 12, wherein the programmable execution unit corresponds to a fragment shader stage that is part of a graphics processing pipeline, and wherein the thread termination circuit corresponds to a fragment culling stage in the graphics processing pipeline, the fragment culling stage indicating to the thread termination management circuit that a respective one or more fragment(s) can be culled, and the thread termination management circuit then determining the corresponding execution threads that should be terminated.

14. The graphics processor of claim 11, wherein the thread termination circuit is operable to indicate to the thread termination management circuit global thread termination events that mean that all of the execution threads in the execution thread group should be terminated.

15. The graphics processor of claim 11, wherein the condition to determine whether to immediately terminate the subset of one or more execution threads is whether or not all of the threads in the thread group should be terminated, wherein the condition is met such that an execution thread can be terminated immediately only when all of the threads in the thread group can be terminated.

16. The graphics processor of claim 11, wherein when the thread termination management circuit determines that it is not possible to terminate a subset of one or more execution threads that should be terminated when the group of execution lanes are in the co-operative state, and hence stores a record for that execution thread, the graphics processor is configured such that the subset of one or more execution threads is terminated once the set of processing operations being performed by the group of execution lanes in the co-operative state has finished and the group of execution lanes has exited the co-operative state.

17. The graphics processor of claim 11, wherein the group of execution lanes is caused to be in the co-operative state in response to an execution thread in the execution thread group executing an activation instruction to cause the group of execution lanes to be in the co-operative state, wherein in response to executing the activation instruction all of the execution lanes are caused to be in an active state regardless of their previous execution state, and wherein an indication of previous execution state is stored to allow lanes to return to their previous execution state when the co-operative state operations have finished.

18. The graphics processor of claim 11, wherein the co-operative state is a single instruction, multiple data execution state.

* * * * *